US012695216B2

(12) United States Patent
Raney et al.

(10) Patent No.: US 12,695,216 B2
(45) Date of Patent: Jul. 28, 2026

(54) SHIELDED JACK, DRAIN WIRE NOTCH AND BUMP DEFLECTION TERMINATION

(71) Applicant: Leviton Manufacturing Co., Inc., Melville, NY (US)

(72) Inventors: Jackson William Raney, Bothell, WA (US); John Walbridge, Lynnwood, WA (US); Charles Bragg, Bothell, WA (US)

(73) Assignee: LEVITON MANUFACTURING CO., INC., Melville, NY (US)

( * ) Notice: Subject to any disclaimer, the term of this patent is extended or adjusted under 35 U.S.C. 154(b) by 257 days.

(21) Appl. No.: 18/414,963

(22) Filed: Jan. 17, 2024

(65) Prior Publication Data

US 2025/0233329 A1 Jul. 17, 2025

(51) Int. Cl.
*H01R 9/03* (2006.01)
*H01R 9/24* (2006.01)

(52) U.S. Cl.
CPC ........... *H01R 9/031* (2013.01); *H01R 9/2416* (2013.01)

(58) Field of Classification Search
CPC ....... H01R 9/031; H01R 9/2416; H01R 24/64
See application file for complete search history.

(56) References Cited

U.S. PATENT DOCUMENTS 3,636,500 A 1/1972 Sedlacek
3,763,461 A 10/1973 Kotski
3,830,957 A 8/1974 Oberdiear
3,845,455 A 10/1974 Shoemaker
3,975,076 A 8/1976 Shida
4,284,316 A 8/1981 Debaigt
(Continued)

FOREIGN PATENT DOCUMENTS

CN 101142757 3/2008
DE 102004004229 3/2006
(Continued)

OTHER PUBLICATIONS

International Search Report and Written Opinion received for PCT Application Serial No. PCT/US2025/011604 dated Apr. 22, 2025, 15 pages.
(Continued)

*Primary Examiner* — Abdullah A Riyami
*Assistant Examiner* — Nader J Alhawamdeh
(74) *Attorney, Agent, or Firm* — Amin, Turocy & Watson, LLP

(57) ABSTRACT

A data cable jack assembly comprises features that ensure secure connectivity between a data cable's drain wire and the assembly's metal door, as well as features that promote consistent and organized termination of the cable's insulated conductors. The assembly includes a wire management component through which is formed a cable reception hole surrounded by a collar on one side of the component. A slot is formed on the collar through which a cable's drain wire can exit the collar, and a raised bump is formed on the outer surface of the collar near the slot, over which the drain wire is routed. The jack assembly's door includes a notch that receives the bump while the door is closed, and the interaction between the slot and the bump establishes a robust electrical connection between the drain wire and the metal jack door.

20 Claims, 17 Drawing Sheets

(56) References Cited

U.S. PATENT DOCUMENTS

| | | | |
|---|---|---|---|
| 4,444,447 | A | 4/1984 | Markwardt |
| 4,552,429 | A | 11/1985 | van Alst |
| 4,682,835 | A | 7/1987 | Aujla |
| 4,747,785 | A | 5/1988 | Roberts |
| 4,749,366 | A | 6/1988 | McCaffery |
| 4,764,124 | A | 8/1988 | Simon |
| 4,790,765 | A | 12/1988 | Ehrenfels |
| 4,810,210 | A | 3/1989 | Komatsu |
| 4,830,628 | A | 5/1989 | Dyson |
| 4,838,811 | A | 6/1989 | Nakamura |
| 4,842,553 | A | 6/1989 | Ingram |
| 4,847,711 | A | 7/1989 | Inoue |
| 4,857,015 | A | 8/1989 | Michaels |
| 4,870,227 | A | 9/1989 | Saen |
| 4,897,040 | A | 1/1990 | Gerke |
| 4,909,754 | A | 3/1990 | Paradis |
| 4,973,258 | A | 11/1990 | Fusselman |
| 4,973,261 | A | 11/1990 | Hatagishi |
| 4,975,078 | A | 12/1990 | Stroede |
| 5,021,610 | A | 6/1991 | Roberts |
| 5,131,863 | A | 7/1992 | Gerke |
| 5,147,215 | A | 9/1992 | Pritulsky |
| 5,169,346 | A | 12/1992 | Johnston |
| 5,228,872 | A | 7/1993 | Liu |
| 5,230,632 | A | 7/1993 | Baumberger |
| 5,278,352 | A | 1/1994 | Schade |
| 5,281,176 | A | 1/1994 | Yahagi |
| 5,310,359 | A | 5/1994 | Chadbourne |
| 5,372,513 | A | 12/1994 | Rodrigues |
| 5,445,538 | A | 8/1995 | Rodrigues |
| 5,501,607 | A | 3/1996 | Yoshioka |
| 5,514,007 | A | 5/1996 | Rodrigues |
| 5,518,423 | A | 5/1996 | Green |
| 5,533,910 | A | 7/1996 | Korner |
| 5,547,405 | A | 8/1996 | Pinney |
| D379,177 | S | 5/1997 | Chu |
| 5,653,609 | A | 8/1997 | Orstad |
| 5,769,647 | A | 6/1998 | Tulley |
| D397,323 | S | 8/1998 | Tulley et al. |
| 5,836,782 | A | 11/1998 | Odley |
| 5,848,911 | A | 12/1998 | Garcin |
| 5,885,111 | A | 3/1999 | Yu |
| 5,947,761 | A | 9/1999 | Pepe |
| 6,010,353 | A | 1/2000 | Ensz |
| 6,056,586 | A | 5/2000 | Lin |
| 6,077,122 | A | 6/2000 | Elkhatib |
| 6,109,954 | A | 8/2000 | Lin |
| 6,142,817 | A | 11/2000 | Lee |
| 6,142,828 | A | 11/2000 | Pepe |
| 6,193,554 | B1 | 2/2001 | Wu |
| 6,224,423 | B1 | 5/2001 | Yip |
| 6,238,231 | B1 | 5/2001 | Chapman |
| 6,254,403 | B1 | 7/2001 | Bernardini |
| 6,254,420 | B1 | 7/2001 | Letailleur |
| 6,267,617 | B1 | 7/2001 | Nozick |
| 6,287,149 | B1 | 9/2001 | Elkhatib |
| 6,305,955 | B1 | 10/2001 | Billman |
| 6,315,596 | B1 | 11/2001 | Chen |
| 6,338,655 | B1 | 1/2002 | Masse |
| 6,347,961 | B2 | 2/2002 | Zhu |
| 6,354,851 | B1 | 3/2002 | Bachle |
| 6,364,707 | B1 | 4/2002 | Wang |
| 6,368,122 | B2 | 4/2002 | Billman |
| 6,371,793 | B1 | 4/2002 | Doorhy |
| 6,379,157 | B1 | 4/2002 | Curry |
| 6,419,510 | B2 | 7/2002 | Shiraki |
| 6,431,903 | B1 | 8/2002 | Dittmann |
| 6,488,525 | B2 | 12/2002 | Abel |
| 6,520,781 | B2 | 2/2003 | Koide |
| 6,520,808 | B2 | 2/2003 | Forbes |
| 6,537,104 | B1 | 3/2003 | Hagmann |
| 6,559,649 | B2 | 5/2003 | Deleu |
| 6,565,375 | B1 | 5/2003 | Daoud |
| 6,582,248 | B2 | 6/2003 | Bachman |
| 6,592,396 | B2 | 7/2003 | Pepe |
| 6,595,696 | B1 | 7/2003 | Zellak |
| 6,726,492 | B1 | 4/2004 | Yu |
| RE38,519 | E | 5/2004 | Doorhy et al. |
| 6,746,283 | B2 | 6/2004 | Arnett |
| 6,749,456 | B1 | 6/2004 | Conner |
| 6,752,647 | B1 | 6/2004 | Lin |
| 6,764,222 | B1 | 7/2004 | Szilagyi |
| 6,767,241 | B1 | 7/2004 | Abel |
| 6,783,386 | B2 | 8/2004 | Clement |
| 6,786,776 | B2 | 9/2004 | Itano |
| 6,796,806 | B2 | 9/2004 | Boutros |
| 6,799,989 | B2 | 10/2004 | Doorhy |
| 6,830,488 | B2 | 12/2004 | Bush |
| 6,869,297 | B2 | 3/2005 | Caveney |
| 6,872,090 | B2 | 3/2005 | Martin |
| 6,923,673 | B2 | 8/2005 | Doorhy |
| 6,953,362 | B2 | 10/2005 | Mossner |
| 6,957,970 | B2 | 10/2005 | Weigel |
| 6,964,587 | B2 | 11/2005 | Colantuono |
| 7,025,621 | B2 | 4/2006 | Mössner |
| 7,033,219 | B2 | 4/2006 | Gordon |
| 7,048,590 | B2 | 5/2006 | Colantuono |
| 7,077,670 | B2 | 7/2006 | Suwa |
| 7,083,472 | B2 | 8/2006 | Gordon |
| 7,086,878 | B2 | 8/2006 | Mine |
| 7,086,909 | B2 | 8/2006 | Colantuono |
| 7,103,968 | B2 | 9/2006 | Karrasch |
| 7,114,985 | B2 | 10/2006 | Doorhy |
| 7,114,987 | B2 | 10/2006 | Nad |
| 7,150,657 | B2 | 12/2006 | Quenneville |
| 7,179,131 | B2 | 2/2007 | Caveney |
| 7,182,649 | B2 | 2/2007 | Caveney |
| 7,195,518 | B2 | 3/2007 | Bert |
| 7,201,618 | B2 | 4/2007 | Ellis |
| 7,220,149 | B2 | 5/2007 | Pharney |
| 7,223,112 | B2 | 5/2007 | Abughazaleh |
| 7,249,962 | B2 | 7/2007 | Milette et al. |
| 7,249,974 | B2 | 7/2007 | Gordon |
| 7,252,554 | B2 | 8/2007 | Caveney |
| 7,255,587 | B2 | 8/2007 | Boeck et al. |
| 7,294,012 | B2 | 11/2007 | AbuGhazaleh |
| 7,306,479 | B1 | 12/2007 | Wu |
| 7,332,678 | B2 | 2/2008 | Pyron |
| D565,443 | S | 4/2008 | Frake |
| 7,384,298 | B2 | 6/2008 | Caveney |
| 7,396,999 | B2 | 7/2008 | Miller |
| 7,404,739 | B2 | 7/2008 | Sheilds |
| 7,413,464 | B1 | 8/2008 | Chen |
| 7,416,448 | B2 | 8/2008 | Gaidosch |
| 7,432,452 | B2 | 10/2008 | Gardner |
| 7,438,567 | B2 | 10/2008 | Nalwad |
| 7,438,583 | B2 | 10/2008 | AbuGhazaleh |
| 7,448,920 | B2 | 11/2008 | Quenneville |
| 7,452,245 | B2 | 11/2008 | Doorhy |
| 7,452,246 | B2 | 11/2008 | Caveney |
| 7,476,120 | B2 | 1/2009 | Patel |
| 7,481,678 | B2 | 1/2009 | Aekins |
| D587,201 | S | 2/2009 | Allwood |
| 7,485,010 | B2 | 2/2009 | Aekins |
| 7,563,125 | B2 | 7/2009 | Pepe |
| 7,568,937 | B2 | 8/2009 | Fitzpatrick |
| 7,575,482 | B1 | 8/2009 | Pepe |
| 7,578,695 | B2 | 8/2009 | Boeck |
| 7,579,556 | B2 | 8/2009 | Tapper |
| 7,597,568 | B1 | 10/2009 | Lu |
| 7,604,515 | B2 | 10/2009 | Siemon |
| 7,605,707 | B2 | 10/2009 | German |
| D603,341 | S | 11/2009 | Kawakami |
| 7,615,714 | B2 | 11/2009 | Pyron |
| 7,621,772 | B1 | 11/2009 | Tobey |
| D606,493 | S | 12/2009 | Yuan |
| 7,637,769 | B2 | 12/2009 | Garcia |
| 7,658,648 | B2 | 2/2010 | Aekins |
| 7,670,193 | B2 | 3/2010 | Milette |
| 7,686,642 | B2 | 3/2010 | Pearson |
| 7,686,643 | B2 | 3/2010 | Pepe |
| 7,704,093 | B2 | 4/2010 | Turkekole |
| 7,713,094 | B1 | 5/2010 | Sparrowhawk |
| 7,726,018 | B2 | 6/2010 | Caveney |

(56) References Cited

U.S. PATENT DOCUMENTS 7,731,542 B2 6/2010 Doorhy
7,736,173 B2 6/2010 Chen
7,736,195 B1 6/2010 Poulsen
7,758,383 B1 * 7/2010 Chantrell ......... H01R 13/65915 439/607.41
7,766,688 B2 8/2010 Ferrus
RE41,699 E 9/2010 Itano
7,821,370 B1 10/2010 Shu
7,823,281 B2 11/2010 Caveney
7,824,231 B2 11/2010 Marti
7,854,624 B1 12/2010 Pepe
7,857,655 B2 12/2010 Gyagang
7,857,663 B2 12/2010 Chantrell
7,871,285 B1 1/2011 Tobey
7,874,865 B2 1/2011 Tobey
7,874,879 B2 1/2011 Caveney
D631,844 S 2/2011 Su et al.
D632,251 S 2/2011 Chen
7,878,855 B2 2/2011 Li
7,883,372 B1 2/2011 Sun
7,887,370 B2 2/2011 Chen
7,892,018 B1 2/2011 Tobey
7,892,027 B2 2/2011 Mao
7,892,028 B2 2/2011 Wu
7,905,015 B2 3/2011 Quenneville
7,909,622 B2 3/2011 Pepe
7,909,647 B2 3/2011 Kawaguchi
7,909,656 B1 3/2011 Erickson
7,914,328 B2 3/2011 Tanaka
7,922,515 B2 4/2011 Fitzpatrick
7,955,120 B2 6/2011 Patel
7,967,645 B2 6/2011 Marti
7,972,150 B1 7/2011 Lin
7,976,334 B2 7/2011 Bishop
8,038,482 B2 10/2011 Erickson
8,043,125 B2 10/2011 Doorhy
8,057,249 B1 11/2011 Tobey
D649,971 S 12/2011 Lyford
8,070,506 B2 12/2011 Martin
8,100,705 B2 1/2012 Chen
8,109,784 B2 2/2012 Patel
8,128,436 B2 3/2012 Bopp
8,137,141 B2 3/2012 Straka
8,167,662 B2 5/2012 Milette
8,198,536 B2 6/2012 Clark
D663,273 S 7/2012 Lyford
8,216,002 B2 7/2012 Doorhy
8,262,415 B2 9/2012 Caveney
8,267,714 B2 9/2012 Siemon et al.
D668,226 S 10/2012 Lyford
8,298,000 B2 10/2012 Patel
8,333,607 B1 12/2012 Moldoch et al.
8,342,877 B2 1/2013 Bruijn
8,353,711 B2 1/2013 Huang
8,376,779 B2 2/2013 Metral
8,425,255 B2 4/2013 Erickson
8,475,201 B2 7/2013 Pirlo
8,550,850 B2 10/2013 Caveney
D694,191 S 11/2013 Lien et al.
8,632,362 B2 1/2014 Straka
8,650,750 B2 2/2014 Engels
8,657,626 B2 2/2014 Duval
8,672,705 B2 3/2014 Schneider
8,690,459 B2 4/2014 Lin
8,715,013 B2 5/2014 Caveney
8,747,126 B2 6/2014 Corbett
8,764,465 B2 7/2014 Huang
8,777,656 B2 7/2014 Kuo
D714,293 S 9/2014 Kelly
8,826,532 B2 9/2014 Caveney
8,834,196 B2 9/2014 Duran
8,834,207 B2 9/2014 Caveney
8,900,015 B2 12/2014 Yuan et al.
D721,036 S 1/2015 Kreitzer
8,944,842 B2 2/2015 Lu
8,968,035 B2 3/2015 Hashim
8,979,588 B2 3/2015 Straka
8,979,592 B2 3/2015 Dang
8,997,345 B2 4/2015 Liu
9,011,181 B2 4/2015 Caveney
D729,806 S 5/2015 Park
9,022,792 B2 5/2015 Sticker
D731,489 S 6/2015 Langhammer
D732,536 S 6/2015 Kang
D733,142 S 6/2015 Solomon
9,147,977 B2 9/2015 Poulsen
D743,398 S 11/2015 Smith
D745,523 S 12/2015 Magi
D746,291 S 12/2015 Solomon
9,251,930 B1 2/2016 McNutt
9,257,805 B2 2/2016 Wang
D752,590 S 3/2016 Bragg
9,281,611 B2 3/2016 Glick
9,281,620 B2 3/2016 Yuan et al.
9,287,635 B2 3/2016 Caveney
9,306,315 B2 4/2016 Scholten
9,331,431 B2 5/2016 Straka
9,337,572 B2 5/2016 Maranto et al.
9,343,822 B2 5/2016 Sparrowhawk
9,379,488 B2 6/2016 Schneider
9,407,044 B2 8/2016 Caveney
9,450,326 B2 9/2016 Engels et al.
9,484,671 B2 11/2016 Zhu
9,496,644 B2 11/2016 Bragg
9,515,437 B2 12/2016 Bragg et al.
9,531,128 B2 12/2016 Caveney
9,627,827 B2 4/2017 Bragg
9,722,370 B2 8/2017 Caveney
9,847,607 B2 12/2017 Bopp
9,859,663 B2 1/2018 Sparrowhawk
9,865,960 B2 1/2018 Fontaine et al.
9,865,975 B2 1/2018 Plamondon et al.
D818,469 S 5/2018 Bragg
D820,215 S 6/2018 Kobayashi
9,991,638 B2 6/2018 Straka
9,991,653 B2 6/2018 Caveney
10,122,135 B2 11/2018 Trio
10,135,207 B2 11/2018 Cui et al.
D839,198 S 1/2019 Chadbourne
10,181,678 B2 1/2019 Pemwieser
10,186,797 B2 1/2019 Fontaine et al.
D841,653 S 2/2019 Lin
D848,430 S 5/2019 Bragg
D852,796 S 7/2019 Liu
10,439,352 B2 10/2019 Cheng et al.
10,476,197 B2 11/2019 Fontaine et al.
10,476,212 B2 11/2019 Bopp et al.
10,522,939 B2 12/2019 De Dios
D879,719 S 3/2020 Hu
10,594,088 B2 3/2020 Cupples et al.
10,608,382 B2 3/2020 Bopp et al.
10,651,608 B2 5/2020 White
D892,053 S 8/2020 Hu
10,777,953 B2 9/2020 White et al.
10,784,640 B2 9/2020 Font Aranega et al.
D901,509 S 11/2020 Bragg et al.
10,897,101 B2 1/2021 Fontaine et al.
10,958,018 B2 3/2021 De Dios et al.
11,056,840 B2 7/2021 Bopp et al.
11,108,204 B2 8/2021 Cheng et al.
11,367,985 B2 6/2022 White et al.
D960,837 S 8/2022 Drasner et al.
11,476,622 B2 10/2022 De Dios et al.
11,502,449 B2 11/2022 Wang
11,509,105 B2 11/2022 Font Aranega et al.
11,575,229 B2 2/2023 Siev et al.
D1,032,529 S 6/2024 Pan et al.
D1,038,033 S 8/2024 Kjaer
D1,049,828 S 11/2024 Jordan et al.
D1,079,448 S 6/2025 Jiang
D1,087,027 S 8/2025 Benham
D1,113,409 S 2/2026 Wang
D1,115,706 S 3/2026 Ober-Woerder
D1,118,324 S 3/2026 Chen

(56) References Cited

U.S. PATENT DOCUMENTS

| | | | | |
|---|---|---|---|---|
| 2001/0049214 | A1 | 12/2001 | Billman | |
| 2002/0155746 | A1 | 10/2002 | Simpson | |
| 2004/0142589 | A1 | 7/2004 | Caveney | |
| 2005/0245125 | A1 | 11/2005 | Colantuono | |
| 2005/0277340 | A1 | 12/2005 | Gordon | |
| 2006/0030184 | A1 | 2/2006 | Sasaki | |
| 2006/0094273 | A1 | 5/2006 | Mine | |
| 2006/0205277 | A1 | 9/2006 | Gordon et al. | |
| 2006/0246784 | A1 | 11/2006 | Aekins | |
| 2007/0026736 | A1 * | 2/2007 | Itano | H01R 13/518 439/607.55 |
| 2007/0032137 | A1 * | 2/2007 | Caveney | H01R 13/5812 439/676 |
| 2007/0049079 | A1 | 3/2007 | Nalwad | |
| 2008/0105449 | A1 | 5/2008 | Kenny | |
| 2008/0311797 | A1 | 12/2008 | Aekins | |
| 2009/0017656 | A1 | 1/2009 | Lee | |
| 2009/0104821 | A1 | 4/2009 | Marti | |
| 2010/0009567 | A1 | 1/2010 | Gyagang | |
| 2010/0029122 | A1 | 2/2010 | Mateo Ferrus | |
| 2010/0035471 | A1 | 2/2010 | Gaidosch | |
| 2010/0041527 | A1 | 2/2010 | Miller | |
| 2010/0206609 | A1 | 8/2010 | Glew | |
| 2011/0028026 | A1 | 2/2011 | Lu | |
| 2012/0015536 | A1 | 1/2012 | Huang | |
| 2012/0094525 | A1 | 4/2012 | Maranto et al. | |
| 2012/0184118 | A1 | 7/2012 | Lee | |
| 2012/0202389 | A1 | 8/2012 | Erickson | |
| 2013/0164967 | A1 | 6/2013 | Lu | |
| 2013/0248221 | A1 | 9/2013 | Booth | |
| 2013/0260581 | A1 | 10/2013 | Kuo | |
| 2014/0027362 | A1 | 1/2014 | Kent | |
| 2014/0057485 | A1 * | 2/2014 | Huang | H01R 13/453 439/527 |
| 2014/0273626 | A1 | 9/2014 | Sparrowhawk | |
| 2015/0029535 | A1 | 1/2015 | Kondoh et al. | |
| 2015/0229078 | A1 | 8/2015 | Caveney | |
| 2015/0295350 | A1 | 10/2015 | Bragg | |
| 2016/0003617 | A1 | 1/2016 | Rocchi | |
| 2016/0036179 | A1 | 2/2016 | Bragg | |
| 2016/0172794 | A1 | 6/2016 | Sparrowhawk | |
| 2016/0240986 | A1 * | 8/2016 | Bragg | H01R 13/4536 |
| 2017/0110833 | A1 | 4/2017 | Riley | |
| 2019/0190218 | A1 * | 6/2019 | White | H01R 13/6592 |
| 2023/0170631 | A1 | 6/2023 | Wu | |
| 2025/0233329 | A1 * | 7/2025 | Raney | H01R 9/031 |
| 2025/0233349 | A1 * | 7/2025 | Raney | H01R 13/514 |
| 2025/0358549 | A1 * | 11/2025 | Bragg | H02G 3/22 |

FOREIGN PATENT DOCUMENTS

| | | | |
|---|---|---|---|
| EP | 0871243 | 7/2002 | |
| EP | 1257011 | 11/2002 | |
| EP | 1422793 | 5/2004 | |
| EP | 1443608 | 8/2004 | |
| EP | 1484824 | 12/2004 | |
| EP | 1753093 | 2/2007 | |
| EP | 1251601 | 1/2010 | |
| EP | 2133957 B1 | 7/2012 | |
| ES | 2583636 | 9/2016 | |
| FR | 2982431 | 5/2013 | |
| GB | 637004 | 5/1950 | |
| GB | 2183405 | 10/1989 | |
| GB | 2343558 | 5/2000 | |
| JP | 2006318801 | 11/2006 | |
| JP | 4039301 | 1/2008 | |
| JP | 4492433 | 6/2010 | |
| TW | I332734 | 11/2010 | |
| TW | I415342 | 11/2013 | |
| WO | 1996008855 | 3/1996 | |
| WO | 2000051206 | 8/2000 | |
| WO | 2005025007 | 3/2005 | |
| WO | 2011087480 | 7/2011 | |
| WO | 2013063233 | 5/2013 | |
| WO | 2015056246 | 4/2015 | |
| WO | WO-2015056246 A1 * | 4/2015 | H01R 24/64 |

OTHER PUBLICATIONS

Lipke, et al. "Wire Manager and Jack" U.S. Appl. No. 29/971,754, filed Nov. 5, 2024, 16 pages.
Lipke, et al. "Wire Manager" U.S. Appl. No. 29/971,757, filed Nov. 5, 2024, 15 pages.
Cui, Wenbo, "High-Speed Data Communications Connector," U.S. Appl. No. 62/289,320, filed Jan. 31, 2016.
Extended European Search Report, dated Aug. 28, 2017, received in European Application No. 15 780 127.
Instruction Sheet 411-93007: AMP NETCONNECT: AMP TWIST-6S Sl Jack, Publication Date of Sep. 26, 2008.
Notice of Allowance dated Dec. 13, 2016, from U.S. Appl. No. 15/135,870, filed Apr. 22, 2016, now U.S. Pat. No. 9,627,827.
Notice of Allowance, dated Jun. 5, 2017, received in U.S. Appl. No. 15/052,630.
Office Action dated Apr. 13, 2016, from U.S. Appl. No. 14/685,379, filed Apr. 13, 2015, now U.S. Pat. No. 9,496,644.
Office Action dated Apr. 13, 2016, from U.S. Appl. No. 14/883,267, filed Oct. 14, 2015, now U.S. Pat. No. 9,515,437.
Office Action dated Apr. 26, 2017, from U.S. Appl. No. 15/341,933, filed Nov. 2, 2016, now U.S. Pat. No. 9,831,606.
Office Action dated Jul. 21, 2016, from U.S. Appl. No. 14/883,415, filed Oct. 14, 2015, now U.S. Pat. No. 9,608,379.
PCT International Search Report and Written Opinion in International application No. PCT/US2015/025621, dated Aug. 10, 2015.
PCT International Search Report and Written Opinion in International application No. PCT/US2016/056374, dated Jan. 24, 2017.
PCT International Search Report and Written Opinion in International application No. PCT/US2016/056499, dated Jan. 29, 2017.
PCT International Search Report and Written Opinion in International application No. PCT/US2017/015709, dated May 17, 2017.
Riley, J. C., "Communication Connector," U.S. Appl. No. 14/883,415, filed Oct. 14, 2015.
Sparrowhawk, B. L., "Communications Connector System," U.S. Appl. No. 15/052,630, filed Feb. 24, 2016.
Tyco Electronics "AMP NET CONNECT" Tyco Electronics, Feb. 22, 2005, 1 page.
Walbridge, et al. "Shielded Jack Flange Termination" U.S. Appl. No. 29/954,510, filed Jul. 26, 2024, 15 pages.
Ex Parte Quayle Action received for U.S. Appl. No. 29/954,510 dated Sep. 30, 2025, 6 pages.
"Leviton 61SJK-RG6 ATLAS-X1 Cat 6 Shielded Jack", Amazon.com, Online available at URL: https://www.amazon.com/Leviton-61SJK-RG6-Atlas-X1-Shielded-Jack/dp/B07VCYWN8D, Jul. 20, 2019, 1 page.
"Q Type Tooless Jack" Surtec https://www.surtec.com.tw/files/products/32458579-Dddf-11ea-9eb8-000c29cf85fb/20220921_190005.jpg (2022).
Non-Final Office Action received for U.S. Appl. No. 29/971,754 dated Mar. 26, 2026, 8 pages.
Notice of Allowance received for U.S. Appl. No. 29/954,510 dated Jan. 14, 2026, 7 pages.
Non-Final Office Action received for U.S. Appl. No. 29/971,757 dated Mar. 26, 2026, 8 pages.
Communication pursuant to Article 94(3) EPC received for EP Patent Application Serial No. 24150876.1 dated Feb. 13, 2026, 13 pages.
Non-Final Office Action received for U.S. Appl. No. 18/760,986 dated Apr. 21, 2026, 10 pages.

* cited by examiner

SHIELDED JACK, DRAIN WIRE NOTCH AND BUMP DEFLECTION TERMINATION

TECHNICAL FIELD

The disclosed subject matter relates generally to data cable connectivity hardware such as data cable jacks, e.g., to a shield jack, a drain wire notch, and/or bump deflection termination.

BACKGROUND

Category cable jacks are often used to terminate category cables and to interface those cables with other terminated cables that plug into the jacks. In some use cases, these jacks are mounted in patch panels or walls, and used to establish data connectivity between category cables terminated on the rear of the jack inside the patch panel or wall and category cables plugged into the jack's front-facing aperture outside the patch panel or wall. To minimize electrical interference with the cable's data signals and ensure error-free data transmission, particularly in high-density jack installations, the cable's shielding should have a reliable connection to ground via, for instance, the cable's drain wire.

The foregoing is merely intended to provide an overview of data jack design considerations relevant to the solutions described herein. Problems with the state of the art, and corresponding benefits of some of the various non-limiting embodiments described herein, may become further apparent upon review of the following detailed description.

SUMMARY

The following presents a simplified summary of the disclosed subject matter in order to provide a basic understanding of some aspects of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

Various embodiments described herein provide a data jack assembly for category cables, such as a shielded twisted-pair cable. The assembly comprises a wire management component having physical features that simplify the process of terminating a data cable to the jack and aid in maintaining an organized routing of the cable's insulated conductors. The wire management component comprises a base section through which a cable reception hole is formed. A collar is formed around a circumference of the cable reception hole on one side of the base section, and conductor organization and retention structures are formed on the opposite side of the base section. A data cable can be inserted through the cable reception hole via the first side of the base section and individual conductors of the cable can be organized and secured for termination on the opposite second side of the base section of the wire management component.

At least one slot is formed on the collar surrounding the cable reception hole, and a raised elongated bump is formed on the outer surface of the collar near the slot. A user can direct the cable's drain wire through the slot such that the drain wire exits the collar through the slot, and then route the drain wire around the collar to a drain wire recess adjacent to the collar. This routing passes the drain wire over the elongated bump.

The jack assembly also includes a conductive metal jack door, comprised of a conductive metal or dielectric material impregnated with a conductive material, at the rear of the jack that at least partially encloses the wire management component while in the closed position. The jack door comprises a curved surface that partially surrounds the collar while in the closed position. A notch is formed in the curved surface of the rear door and is oriented to receive the collar's bump while the door is in the closed position. When the jack door is in the closed position while the drain wire is routed over the notch on the collar, the drain wire is pinched between the bump of the collar and the notch of the door, establishing a robust ground connection of the category cable's drain wire to the conductive metal rear door of the jack.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the drawings. It will also be appreciated that the detailed description may include additional or alternative embodiments beyond those described in this summary.

DETAILED DESCRIPTION

Figure 1:
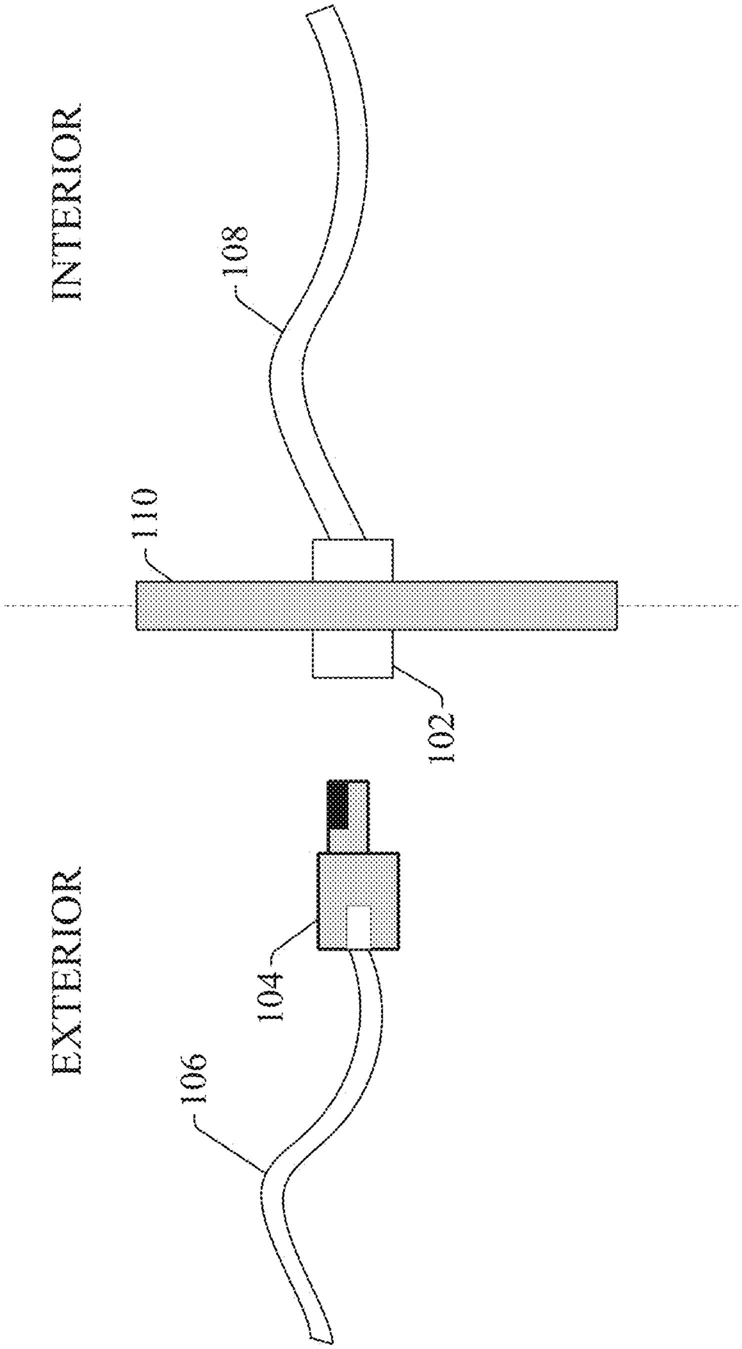
FIG. 1 is a side view of an example jack used to interface two category cables.

The subject disclosure is now described with reference to the drawings wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

Some reference numbers used herein to label illustrated components are suffixed with letters to delineate different instances of a same or similar component. In general, if a reference number without an appended letter is used within this disclosure, the descriptions ascribed to the reference number are to be understood to be applicable to all instances of that reference number with or without an appended letter unless described otherwise.

Category cable jacks are often used to terminate category cables, such as shielded twisted pair cables, and to interface those cables with other terminated cables that plug into the jacks. FIG. 1 is a side view of an example jack 102 used to interface two category cables 106 and 108. In an example application, a category cable jack 102 is mounted in a patch panel 110 or wall. A data cable 108, such as a shielded twisted pair cable, disposed on the "interior" side of the patch panel 110 is terminated on a rear (or "interior"-facing) side of the jack 102 such that the individual insulated conductors of the cable 108 are electrically connected to the conductive contacts or tines of the jack 102. A second category cable 106 disposed on the "exterior" side of the patch panel 110 is terminated with a data plug 104 of the same standard as the jack 102 (e.g., an RJ45 plug), and this plug 104 can be plugged into the "exterior"-facing aperture of the jack 102 to establish electrical coupling, and thus data transmission, between the conductors of cable 106 and the conductors of cable 108.

Figure 5:
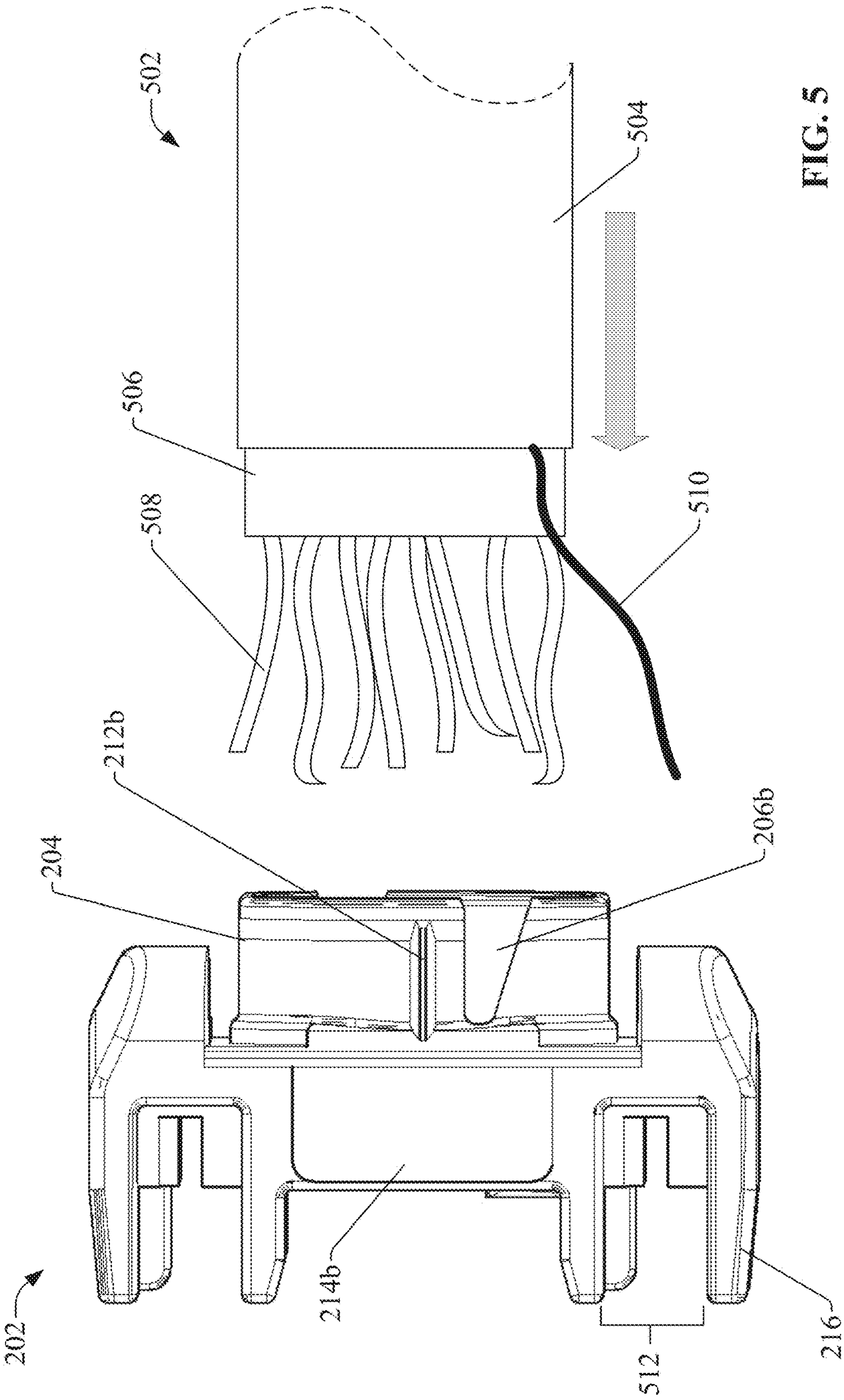
FIG. 5 is a side view of the wire management component with a category cable aligned for insertion into the wire management component.
Figure 15:
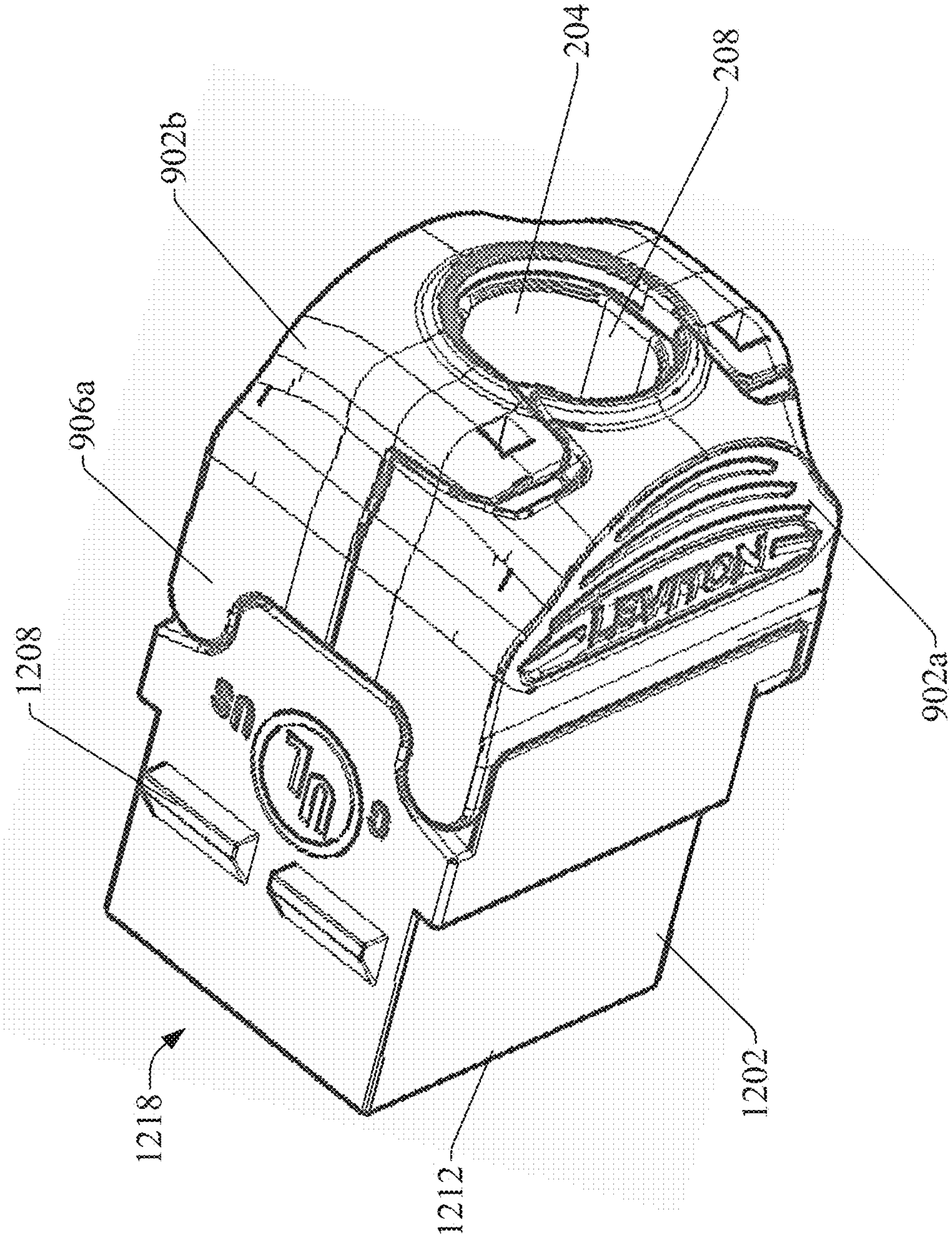
FIG. 15 is a perspective rear view of the assembled wire management component and jack body with two rear jack doors attached.
Figure 16:
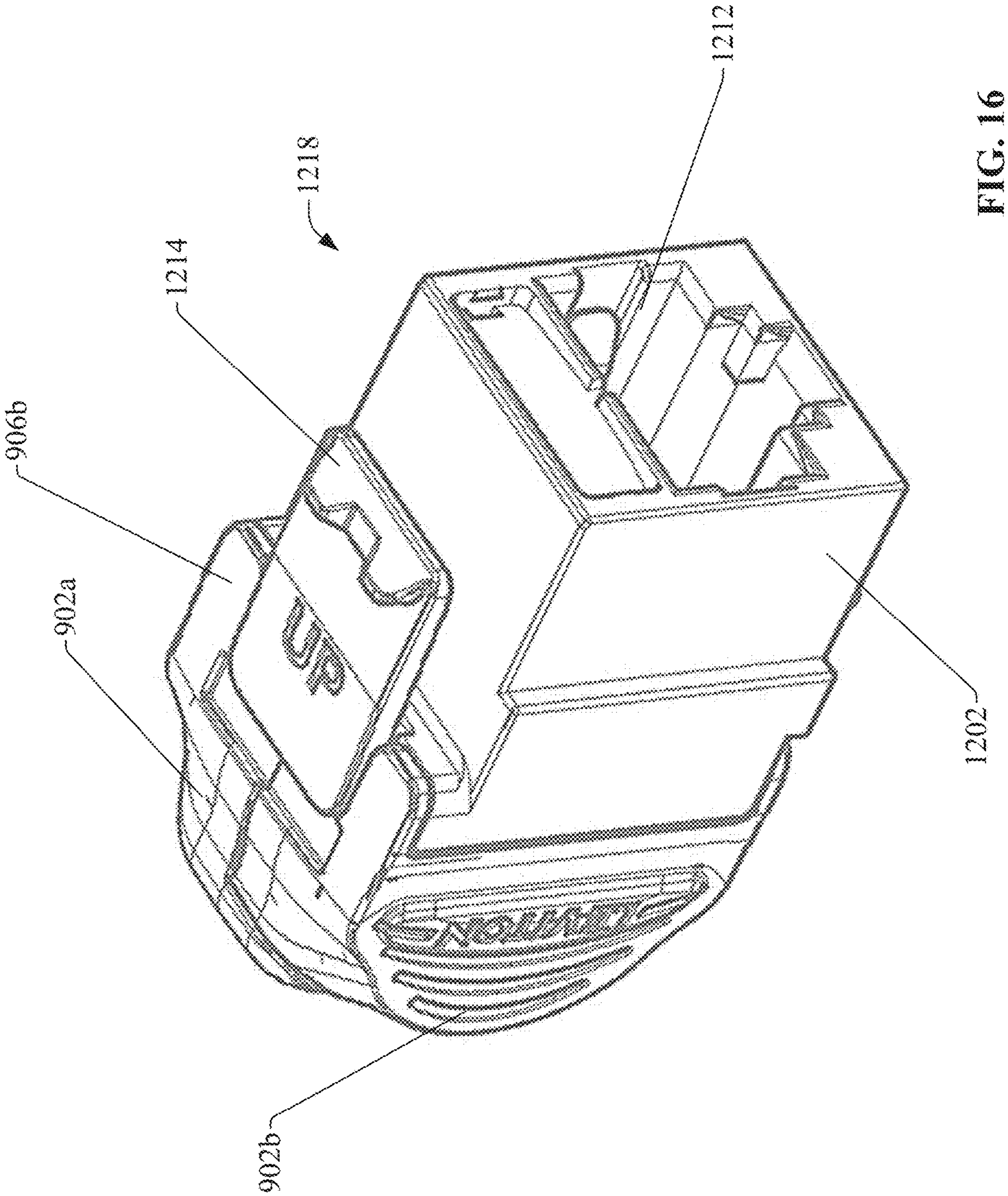
FIG. 16 is a perspective front view of the assembled wire management component and jack body with the two jack doors attached at the rear, cable-receiving end of the jack housing and the plug aperture at the opposing front end of the jack housing.

As depicted in FIG. 5, category cables 502 configured to be terminated to category connectors (e.g., RJ45 jacks (102) and plugs (104)) can include a layer of metallic or foil shielding 506 that surrounds the cable's insulated electrical conductors 508. When properly grounded via the cable's drain wire 510, this shielding 506 can mitigate the effects of electrical interference on the cable's data signals, which could otherwise introduce errors in data transmission. To ensure proper grounding, the cable's drain wire 510 should make secure and reliable contact with the metal casing or framework of the jack 102 (see also FIGS. 15 and 16 depicting category jack 1218 having jack body 1202 and rear doors 902*a*, 902*b*—all of which may be comprised of electrically conductive material, with cable reception hole 208 at the rear of jack 1218 and plug aperture 1212 disposed at the front of jack 1218, which itself can be grounded via the electrically conductive components of the framework of patch panel 110).

To address these and other issues, one or more embodiments described herein provide a category cable jack assembly having features that ensure secure and robust connectivity between the cable's drain wire and the jack assembly's metal doors, as well as features that promote consistent and organized termination of the cable's insulated conductors.

Figure 2:
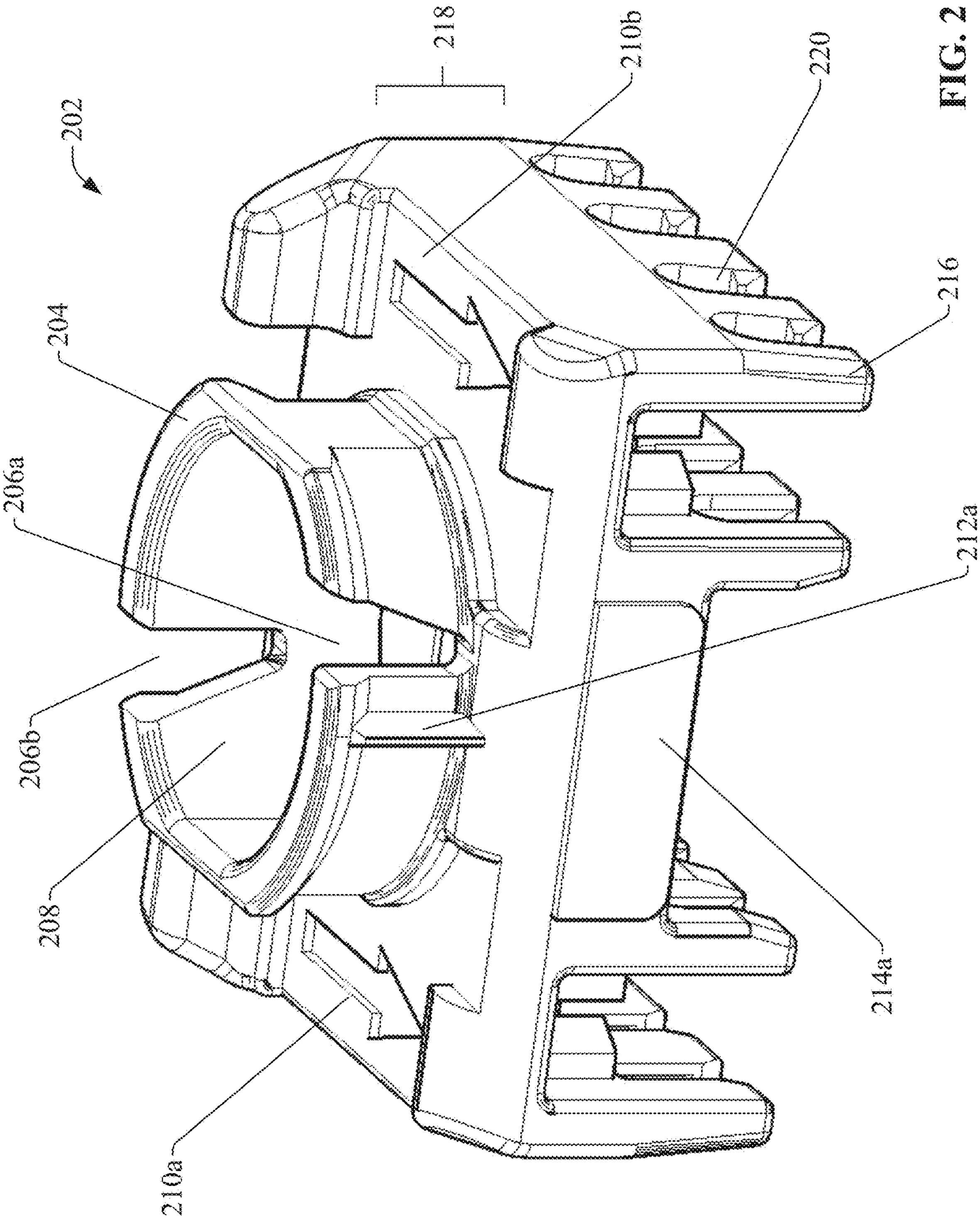
FIG. 2 is a perspective view of an example wire management component for use with a category cable jack.
Figure 3:
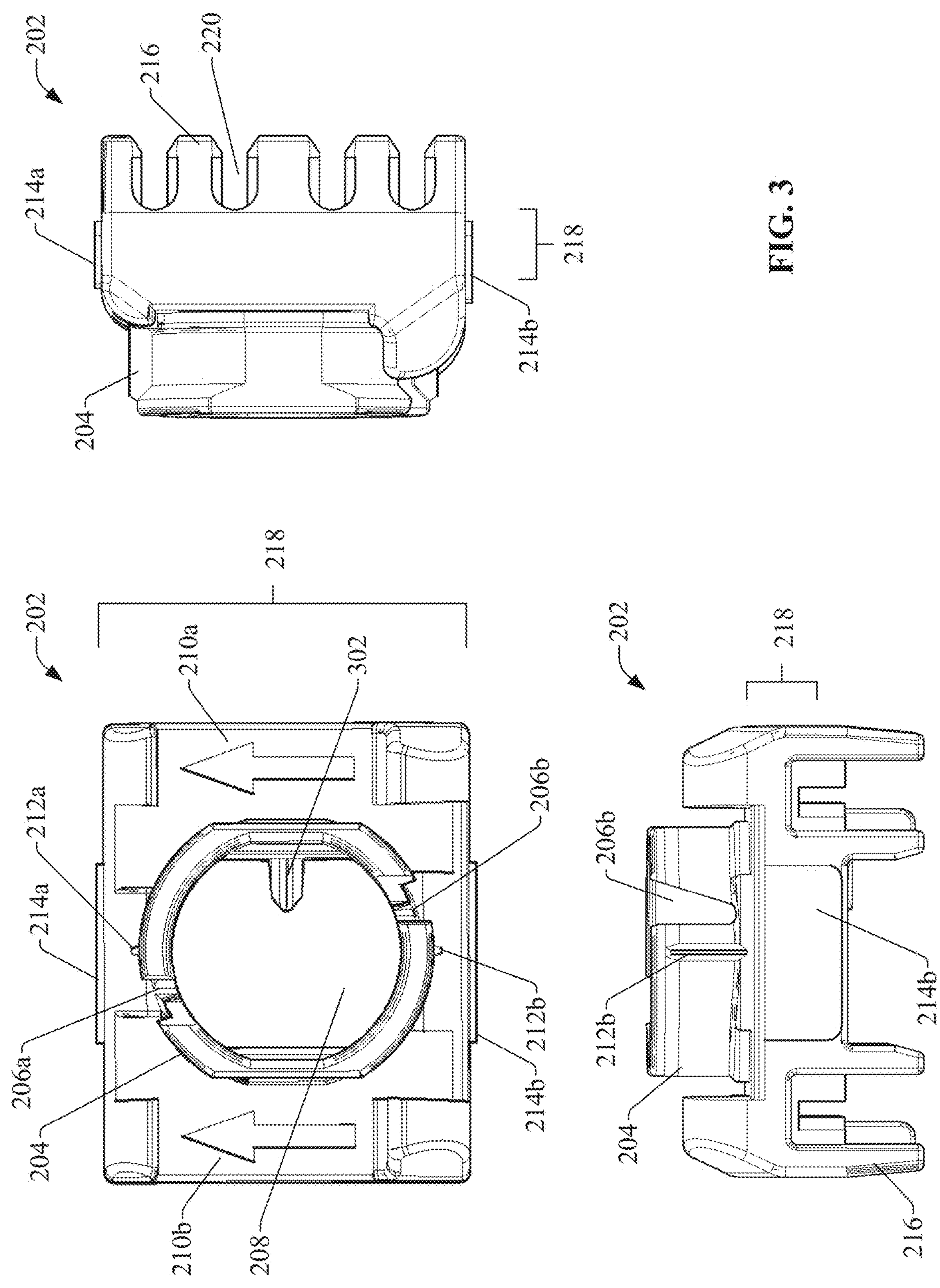
FIG. 3 is an orthographic projection view of the wire management component.
Figure 4:
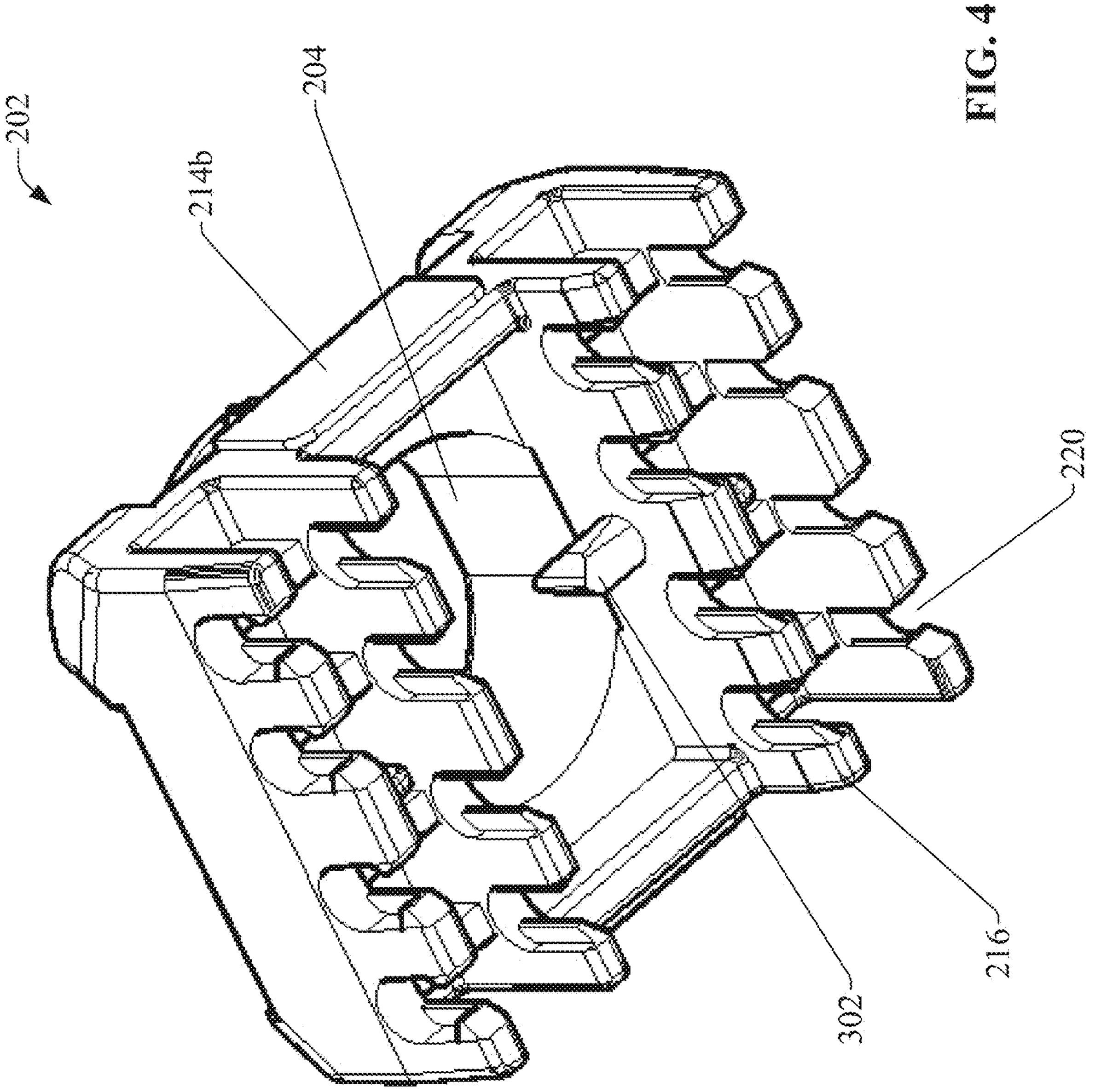
FIG. 4 is another perspective view of the wire management component depicting the bottom of the component.

FIG. 2 is a perspective view of an example wire management component 202 for use with a category cable jack (to be described in more detail herein). FIG. 3 is an orthographic projection view of the wire management component 202. FIG. 4 is another perspective view of the wire management component 202 displaying the bottom of the component 202. Wire management component 202 comprises a solid body having a base section 218 through which a cable reception hole 208 is formed. In the illustrated example, the base section 218 has a substantially rectangular shape. However, base sections 218 of other shapes are also within the scope of one or more embodiments. Multiple conductor retaining towers 216 are formed on the bottom side of the base section 218. In the illustrated example, these conductor retaining towers 216 comprise four substantially parallel walls that project perpendicularly from the bottom of the base section 218, with a series of four retaining notches 220 formed along the bottom edge of each conductor retaining tower 216. Two conductor retaining towers 216 are formed on each of two opposite sides of the cable reception hole 208, with the retaining notches 220 of adjacent conductor retaining towers 216 substantially aligned with one another. Individual conductors of a category cable can be pressed into, and held by, these retaining notches 220. It is to be appreciated that embodiments of the wire management component 202 are not limited to the wire management structure illustrated in FIGS. 2-4, and that substantially any type or arrangement of conductor retaining mechanisms can be incorporated into the design of the wire management component 202 without departing from the scope of one or more embodiments.

On the top side of the base section 218 (that is, the side of the base section 218 that will receive the data cable), the cable reception hole 208 is surrounded by a collar 204 that projects from the base section 218 and traverses the perimeter of the cable reception hole 208. Two raised elongated bumps 212*a* and 212*b* are formed on the outer surface of the collar 204. The bumps 212*a* and 212*b* are located on opposite sides of the collar 204, each facing toward one of the two long edges of the rectangular base section 218. The bumps 212*a* and 212*b* extend substantially perpendicular to the surface of the base section 218 from the bottom edge of the collar 204 to the top edge of the collar 204 (or to a point near the top edge).

Figure 12:
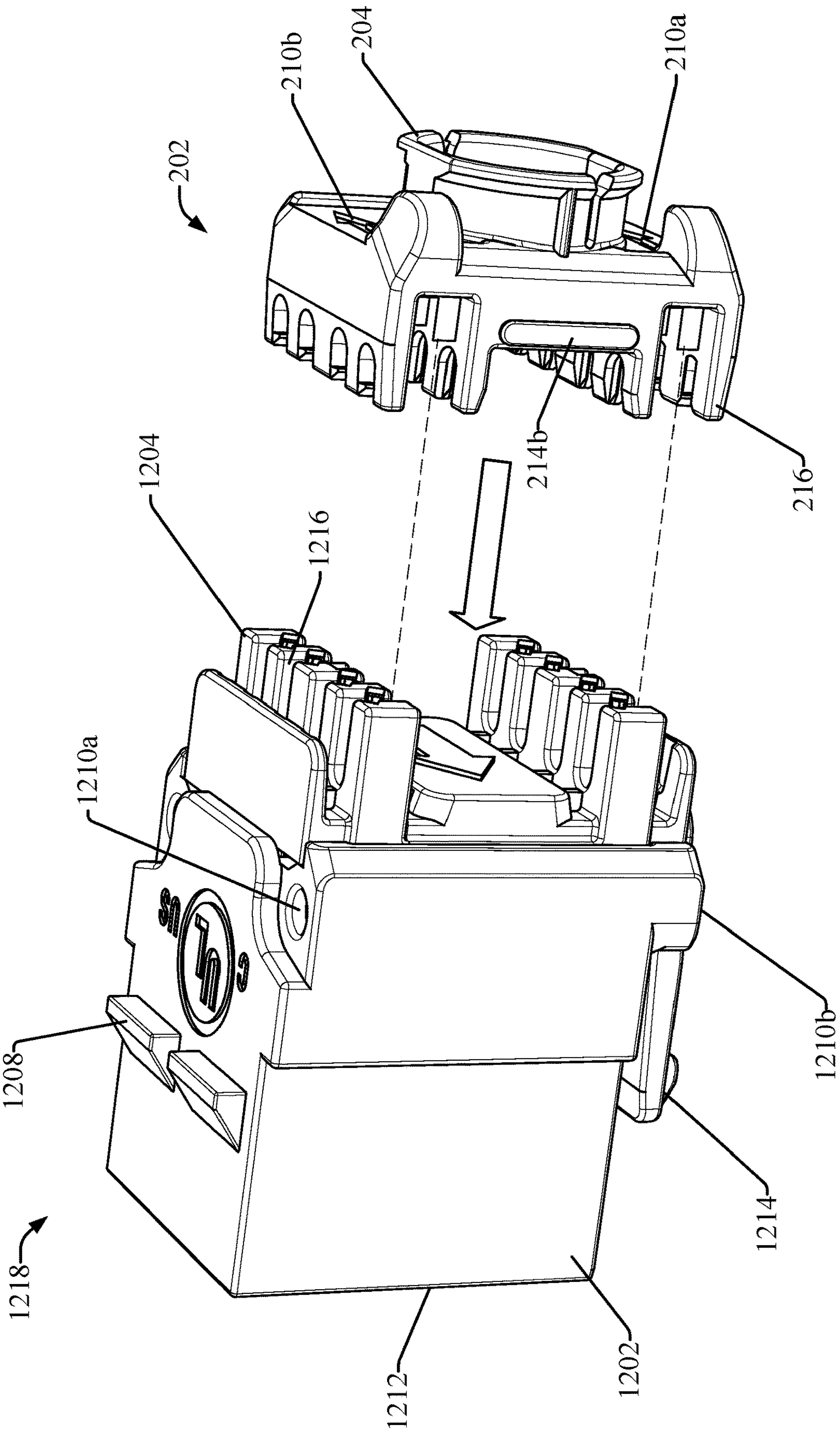
FIG. 12 is a perspective view of the wire management component aligned for coupling with the rear end of the jack.

Two slots 206*a* and 206*b* are also formed on the collar 204. Each slot 206*a*, 206*b* is formed near, or adjacent to, one of the raised elongated bumps 212*a*, 212*b* and opens at the top edge of the collar 204. Each slot 206*a*, 206*b* extends from the bottom edge of the collar 204 (or from a point near the bottom edge of the collar 204) to the top edge of the collar 204, creating corresponding gaps along the top edge of the collar 204 where the slots 206*a*, 206*b* meet the top edge. These gaps serve as entrances into the slots 206*a*, 206*b* through which the cable's drain wire 510 (see, e.g., FIG. 5) is received, as will be described in more detail herein. At least one edge of each slot 206*a*, 206*b* is angled relative to its opposing edge, causing the tops of the slots 206*a*, 206*b* (and their corresponding gaps along the top edge of the collar 204) to be wider than the bottoms of the slots 206*a*, 206*b*. That is, the slots 206*a*, 206*b* are tapered from the top edge of the collar 204 to the bottom edge of the collar 204. The relatively wide slot entrances can assist in guiding the cable's drain wire 510 into the slots 206*a*, 206*b* as the conductors 508 of the cable are being arranged and secured on the wire management component 202 in preparation for termination to contacts 1216 (e.g., insulation displacement contacts ("IDC") as shown in FIG. 12) positioned within the jack housing.

The wire management component 202 also comprises two drain wire recesses 210*a* and 210*b*, which are adjacent to the collar 204 on the top surface of the base section 218. The drain wire recesses 210*a* and 210*b* comprise the areas of the top surface of the base section 218 between the collar 204 and each of the two short edges of the rectangular base section 218 (that is, the two edges that are adjacent to the long edges toward which the bumps 212*a* and 212*b* face). These drain wire recesses 210*a*, 210*b* serve to hold the cable's excess drain wire, as will be described in more detail herein.

As can be seen in the bottom view of the wire management component 202 of FIG. 4, a single cable stop post 302 is formed on the base 218, adjacent one of the two conductor retaining towers 216 which, in turn, is adjacent to the cable reception hole 208. The single cable stop post 302 is formed on the inward-facing surface of the base 218 and is located a small distance below the hole 208 such that the single cable stop post 302 protrudes into the path of a cable that would be inserted through hole 208 from the top of the wire management component 202. When a cable is inserted through the hole 208 from the top of the wire management component 202, the single cable stop post 302 acts as a hard stop that impedes the leading edge of the cable's jacket, preventing the leading edge of the cable's jacket from being inserted beyond a fixed distance from the bottom of the hole 208 (a distance corresponding to the distance between the exit of the hole 208 and the cable stop post 302).

Two raised removal ridges 214*a* and 214*b* are also formed on two opposite sides, respectively, of the wire management component 202. In the illustrated example, the removal ridges 214*a* and 214*b* are formed on the outward-facing surfaces of the two long sides of the base section 218 (that is, the same sides of the base section 218 toward which the bumps 212*a* and 212*b* face). These removal ridges 214*a* and 214*b* serve as grip points for a user's fingers when disconnecting the wire management component 202 from its associated jack assembly, as will be described in more detail herein.

FIG. 5 is a side view of the wire management component 202 with a category cable 502 (e.g., a shielded twisted pair cable) aligned for insertion through the cable reception hole 208 of wire management component 202. The category cable 502 comprises multiple twisted pairs of insulated conductors 508 housed within a cable jacket 504. The insulated conductors 508 as a group are wrapped with metallic or foil shielding 506, which is layered between the group of insulated conductors 508 and the cable jacket 504. The cable 502 also houses a conductive drain wire 510 that traverses the length of the cable 502 between the shielding 506 and the cable jacket 504, making electrical contact with the shielding 506. When properly grounded this drain wire 510 serves as a path to ground for the shielding 506, and the grounded shielding 506 mitigates the adverse effects of electrical interference (such as alien crosstalk) on the data signals passing through the conductors 508.

Figure 6:
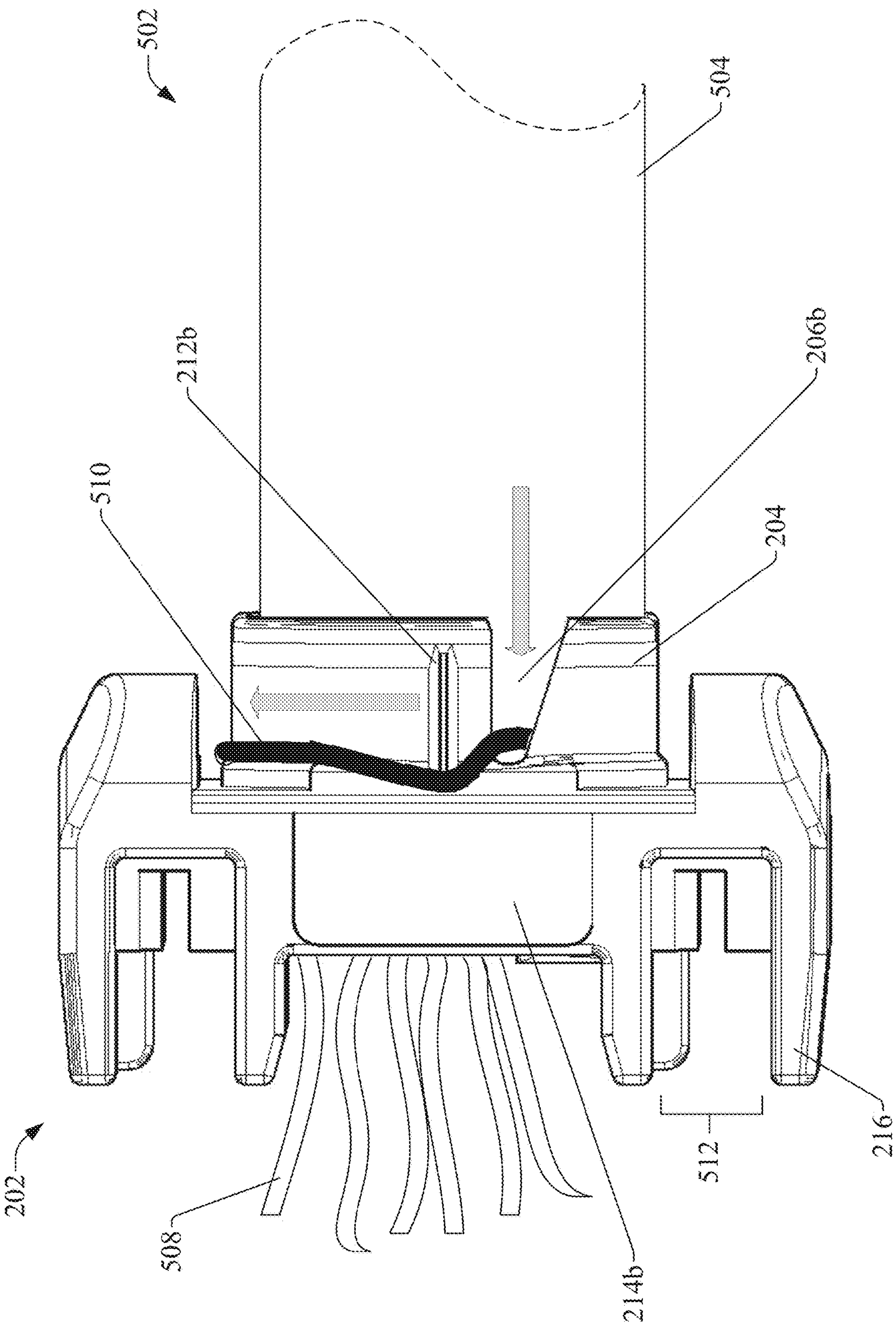
FIG. 6 is a side view of the wire management component and cable after the cable has been inserted through the wire management component's cable reception hole.

Prior to installation, a portion of the cable jacket 504 is stripped to expose lengths of insulated conductors 508 and a segment of the drain wire 510. To install the cable 502 on the wire management component 202, the stripped end of the cable 502, including the exposed insulated conductors 508, is inserted through the cable reception hole 208 via the top side of the wire management component 202 (that is, via the side of the cable reception hole 208 surrounded by collar 204). Rather than being pulled through the cable reception hole 208 along with the insulated conductors 508, the drain wire 510 is pulled aside (or can be folded back against the cable's jacket 504) so that the drain wire 510 can be routed through one of the slots 206. FIG. 6 is a side view of the wire management component 202 and cable 502 after the cable 502 has been inserted through the cable reception hole 208. The wire management component 202 permits the cable 502 to be inserted through the cable reception hole 208 until the leading edge of the cable jacket 504 abuts against the cable stop post 302 (see FIGS. 3 and 4), which limits the length of the cable jacket 504 that is permitted to pass beyond the exit of the cable reception hole 208 to a length corresponding to the distance between the exit of the cable reception hole and the cable stop post 302. The use of cable stop post 302 to limit the insertion depth of the jacketed portion of the cable 502 can ensure general consistency in the length of exposed conductors 508 that are held by the conductor retaining towers 216, which can result in a neater organization of conductors 508 and reduced susceptibility to coupling between adjacent conductor pairs. In the illustrated example, the wire management component 202 includes only a single cable stop post 302. The use of a single cable stop post 302 to limit insertion of the jacket 504 can afford the user a greater degree of freedom in manipulating the conductors 508 relative to a more intrusive stopping mechanism.

Figure 7:
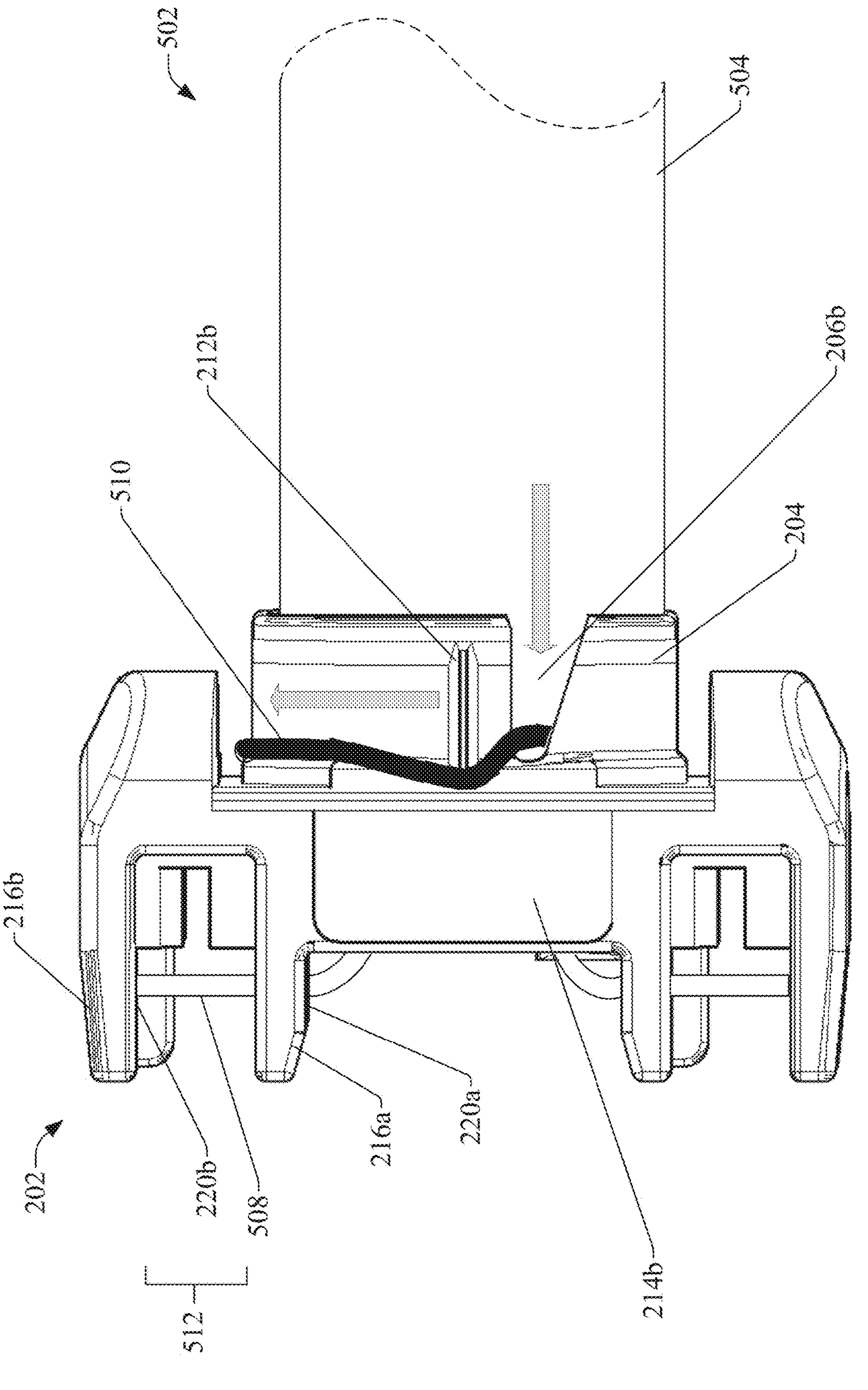
FIG. 7 is a side view of the wire management component and cable with the insulated conductors of the cable inserted into retaining notches of the wire management component's retaining towers.

While the cable 502 is inserted through the cable reception hole 208, the exposed insulated conductors 508, which are now located on the side of the wire management component 202 containing the conductor retaining towers 216, can be installed on the retaining notches 220. FIG. 7 is a side view of the wire management component 202 and cable 502 with the insulated conductors 508 inserted into, and retained by, the retaining notches 220 of the conductor retaining towers 216. The conductor retaining towers 216 are comprised of a non-conductive, dielectric material with individual conductors 508 inserted into, and retained by, the retaining notches 220. In the illustrated example, each conductor 508 of the cable 502 is terminated across two adjacent conductor retaining towers 216 (e.g., conductor retaining towers 216*a* and 216*b*). Specifically, the conductor 508 is inserted into a retaining notch 220*a* of a first conductor retaining tower 216*a* adjacent to the cable reception hole 208, and is also inserted into a conductor retaining notch 220*b* of a second conductor retaining tower 216*b* adjacent to the first conductor retaining tower 216*a*, where the two retaining notches 220*a* and 220*b* are an aligned pair. When the conductor 508 is held by the notches 220*a* and 220*b* in this manner, a segment of the conductor 508 traverses the gap 512 between the two conductor retaining towers 216*a* and 216*b*. This conductor segment will interface with the cutting edge of an insulation displacement contact ("IDC") configured to pierce the outer insulating layer of each insulated conductor 508 to electrically couple the inner conductive core of each insulated conductor 508 with the IDC, when the wire management component 202 is connected to the jack body. It is to be appreciated that the conductor arrangement and retention method illustrated herein is only intended to be exemplary, and that any suitable conductor retention and organizing mechanism can be implemented in the design of the wire management component 202 without departing from the scope of one or more embodiments.

Figure 8:
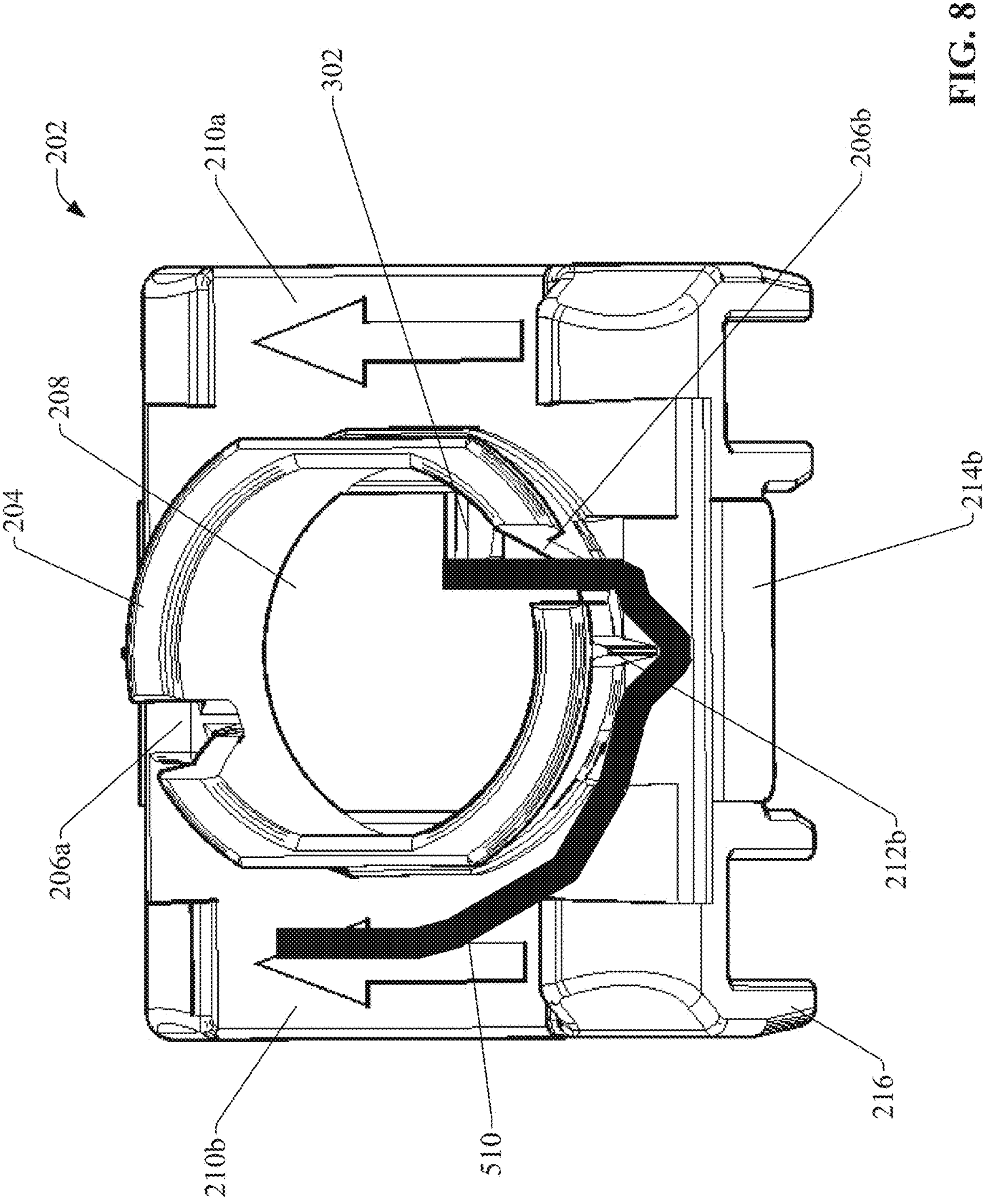
FIG. 8 is a perspective view of the wire management component illustrating the routing of the drain wire.

Rather than being pulled through cable reception hole 208 along with the cable's conductors 508, the cable's drain wire 510 is instead seated in one of the two slots 206*a* or 206*b* of the collar 204 of the wire management component 202. FIG. 8 is a perspective view of the wire management component 202 illustrating the routing of the drain wire 510 (the cable 502 is omitted from FIG. 8 for clarity). As can be seen in this figure, as well as in FIGS. 6 and 7, the drain wire 510 is inserted into the slot 206 such that the drain wire 510 exits the collar 204 through the bottom of the slot 206, and is then routed around the collar 204 to one of the two drain wire recesses 210*a* and 210*b*. The tapered shape of the slot 206, which yields a relatively wide slot entrance on the edge of the collar 204, assists the user in guiding the drain wire 510 into the slot 206. The drain wire 510 is routed to the drain wire recess 210*a* or 210*b* that is farthest from the slot 206 through which the drain wire 510 exits, which causes the drain wire 510 to pass over the elongated bump 212 that is adjacent to the slot 206. Any excess length of the drain wire 510 resides on the drain wire recess 210.

Figure 9:
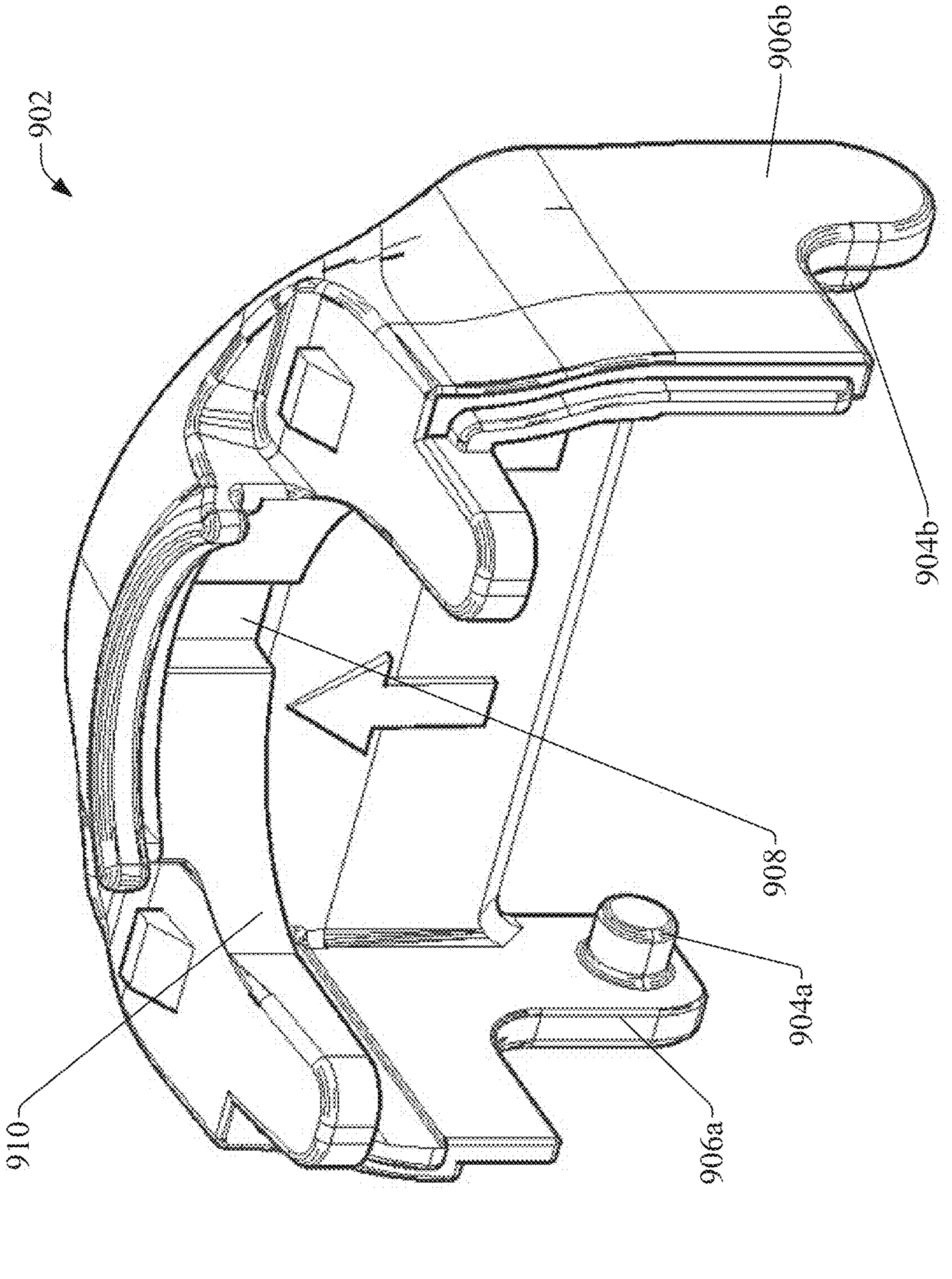
FIG. 9 is a perspective view of an example jack rear door that interfaces with the wire management component as part of a jack assembly.

The bump 212, together with a corresponding notch (e.g., notch 908) on a rear conductive jack door (e.g., rear door 902) (see, e.g., FIG. 9) that closes over the wire management component 202, leverage the mechanical properties of the drain wire 510 to establish secure electrical contact between the drain wire 510 and the jack door 902. FIG. 9 is a perspective view of an example jack door 902 that interfaces with the wire management component 202 as part of a jack assembly. Jack door 902 comprises two hinge arms 906*a* and 906*b* on which are formed respective two inward-facing dowels 904*a* and 904*b*. Dowels 904*a* and 904*b* are configured to engage with corresponding holes (not shown in FIG. 9) that are part of the jack assembly to form a hinge. The resulting hinge is located below the wire management component 202 when the jack components are assembled, such that the door 902 pivots about the dowels 904*a*, 904*b* between an open position that exposes wire management component 202 and a closed position that partially encloses the wire management component 202.

Figure 10:
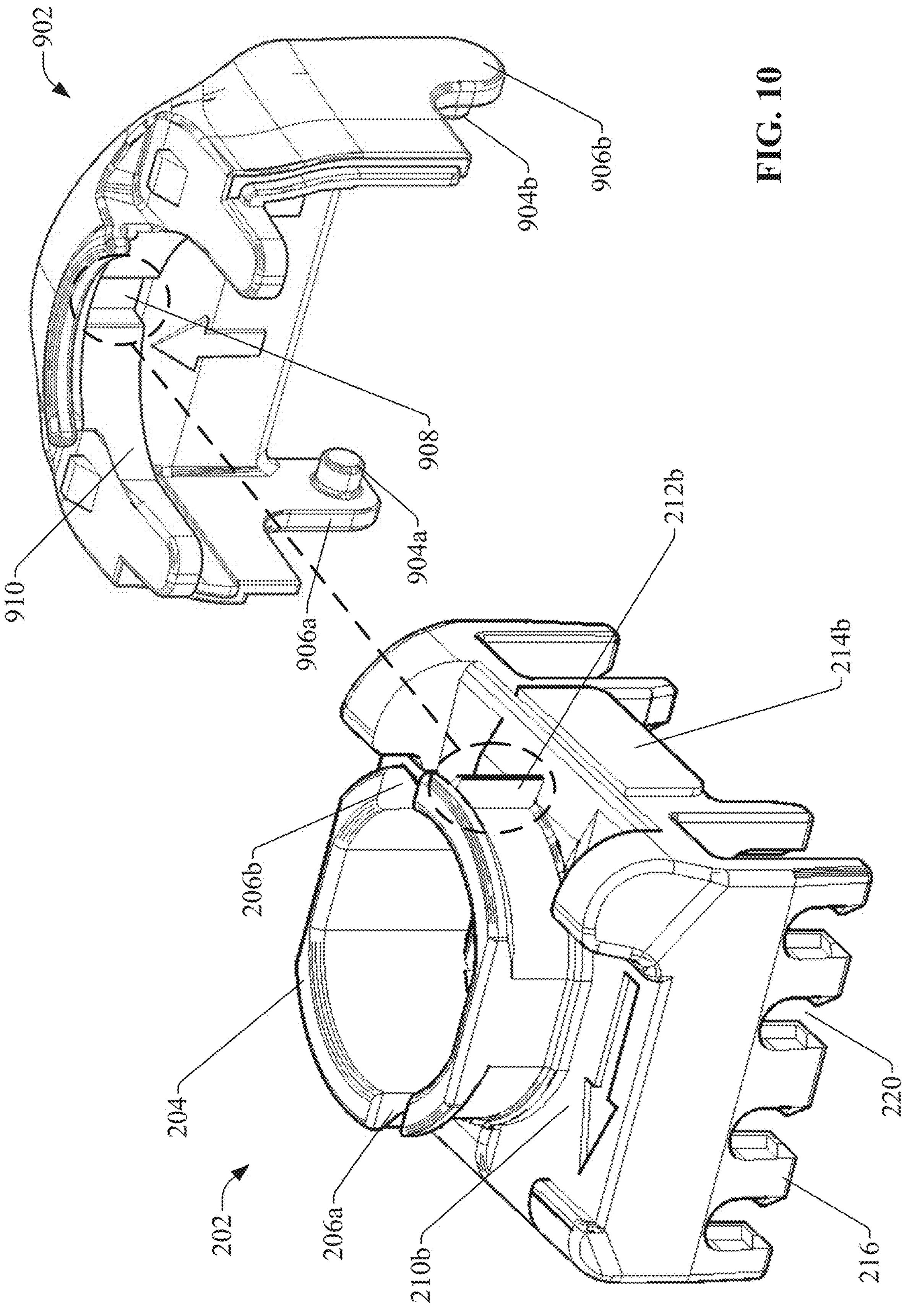
FIG. 10 is a perspective view of the jack rear door and the wire management component illustrating the correspondence between the notch on the jack rear door and the bump on the wire management component.

Jack door 902 also comprises a curved surface 910 that partially surrounds the collar 204 of the wire management component 202 while the jack door 902 is in the closed position. A notch 908 is formed on this curved surface 910 of jack door 902 at a location that corresponds to the location of the elongated bump 212 on the collar 204. FIG. 10 is a perspective view of the jack door 902 and the wire management component 202 illustrating the correspondence between the notch 908 and the bump 212. When the rear jack door 902 is in the closed position, the bump 212 on the collar 204 resides within the notch 908 formed on the curved surface 910 of the rear jack door 902. If the drain wire 510 is routed over the bump 212 while the rear jack door 902 is closed (as shown in FIGS. 6-8), the portion of the drain wire 510 that traverses over the bump 212 is pinched between the bump 212 and the notch 908.

Figure 11:
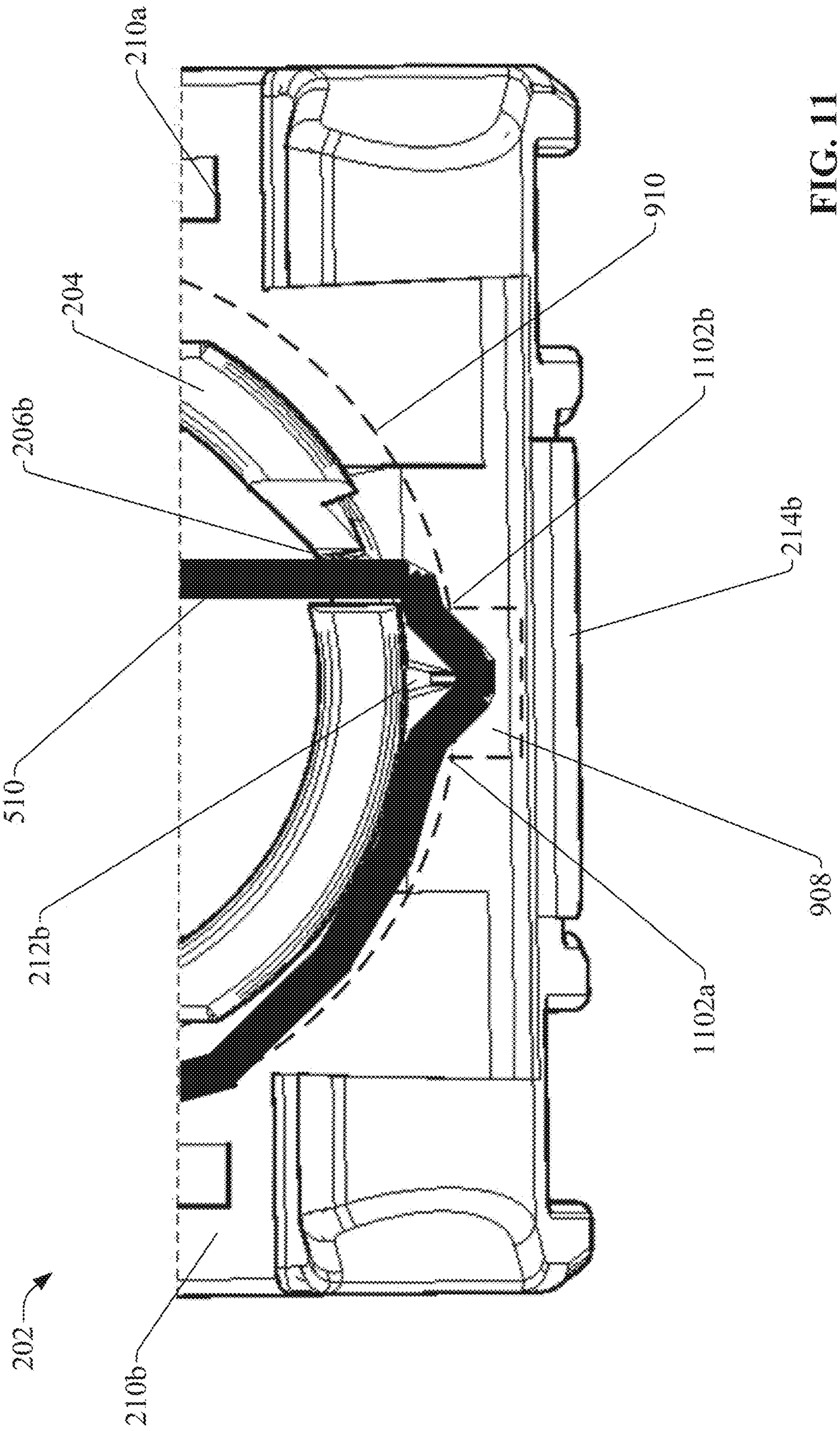
FIG. 11 is a close-up view of the wire management component illustrating the pinching of the drain wire between the bump of the wire management component and the notch in the rear door of the jack while the jack door is in the closed position.

FIG. 11 is a close-up view of the wire management component 202 illustrating the pinching of the drain wire 510 between the bump 212 and the notch 908 while the rear jack door 902 is in the closed position. In this figure, the curved surface 910 of the rear jack door 902 and the notch 908 formed in the curved surface 910 are represented as dashed lines for clarity. As can be seen in this figure, while the rear jack door 902 is in the closed position, the convex corners 1102*a* and 1102*b* of the notch 908—that is, the convex corners 1102*a*, 1102*b* formed between the curved surface 910 and the notch 908—press against respective two points on the drain wire 510 on either side of the elongated bump 212. In addition to establishing electrical contact between the contact points of the drain wire 510 and the two corners 1102*a* and 1102*b*, the compression force applied to these points of the drain wire 510 by the two convex corners 1102*a* and 1102*b* causes portions of the drain wire 510 near the corners 1102*a*, 1102*b* to deflect toward the curved surface 910 of the rear jack door 902 due to the spring properties of the drain wire 510. Thus, the bump 212 and the notch 908 act together to securely retain the position of the drain wire 510 and to establish a robust electrical connection between the drain wire 510 and the metal rear jack door 902, ensuring that the cable's shielding has a secure path to ground via the metallic surface of the rear jack door 902.

While the rear jack door 902 is in the closed position, the excess length of drain wire 510 resides in one of the two drain wire recesses 210*a* and 210*b* (see, e.g., FIG. 8, which depicts the excess drain wire 510 residing in recess 210*b*). The rear jack door 902 and the drain wire recesses 210*a* and 210*b* are designed such that, while the rear jack door 902 is in the closed position, there is a space between the surfaces of the drain wire recesses 210*a*, 210*b* and the section of the rear jack door 902 above the recesses 210*a*, 210*b*. This space provides clearance within which the excess portion of the drain wire 510 resides without being pinched between the recesses 210*a*, 210*b* and the rear jack door 902, and without increasing termination force.

FIG. 12 is a perspective view of the wire management component 202 aligned for mating with a jack body 1202 of a jack 1218. In this example design, jack 1218 comprises a jack body 1202 having an aperture 1212 (not visible in FIG. 12, but visible in FIG. 16) configured to receive a category cable plug (e.g., an RJ45 plug). The aperture 1212 faces through the front side of the jack body 1202. One or more IDC towers 1204 are formed on the opposing rear side of the jack body 1202. Similar to conductor retaining towers 216, these IDC towers 1204 are substantially parallel non-conductive walls that project perpendicularly from the rear of the jack body 1202. A series of conductive IDCs 1216, that are disposed in, and electrically coupled to, a printed circuit board (PCB) within the jack body 1202 (not shown), reside within, and are electrically isolated by, each IDC tower 1204. It is these IDC 1216 upon which cable conductors 508 are electrically terminated when the wire management component 202 is coupled to the rear end of jack body 1202.

Figure 13:
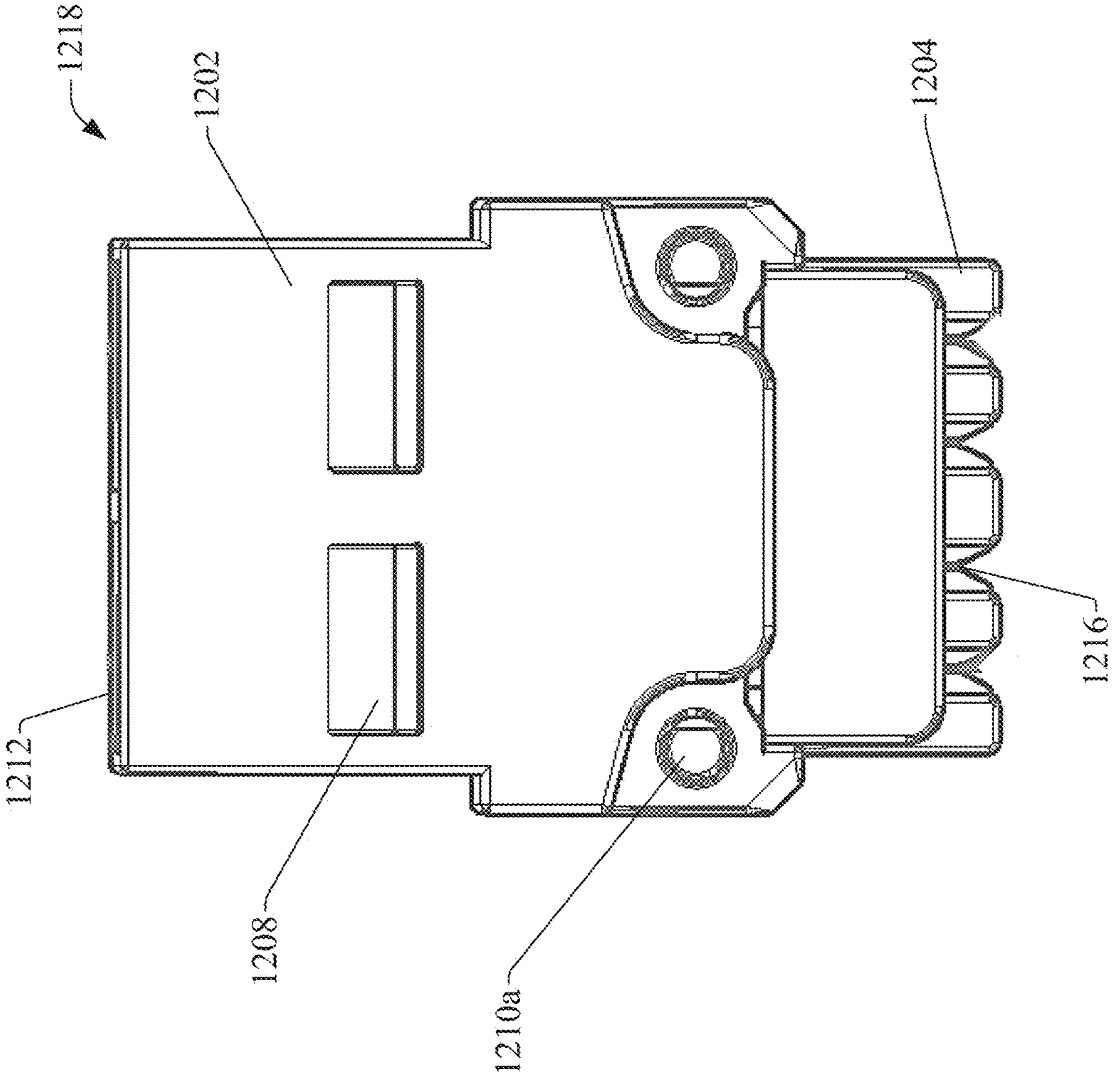
FIG. 13 is a view of one of the four outer surfaces of the jack housing.

FIG. 13 is a view of one of the sides of the jack 1218 in which the IDCs 1216, residing within IDC towers 1204, can be seen. The IDCs 1216 are electrically connected, via conductive traces of the PCB (not shown) in which the IDCs 1216 are disposed, to respective conductive tines that extend from the opposing side of the PCB (not shown) outward and into the aperture 1212 of the jack 1218 and so positioned to electrically couple the conductive blades of a category plug (not shown) inserted into the aperture 1212. Two hinge holes 1210*a*, 1210*b* are formed on two opposite rear corners of the jack body 1202, and are configured to receive the dowels 904*a* and 904*b* of the jack door 902. A cantilevered latch 1214 (see, e.g., FIG. 14) is formed on one side of the jack body 1202, and two raised wall stops 1208 (see, e.g., FIGS. 13, 14) are formed on the side of the jack body 1202 opposite the side on which the latch 1214 is formed. The latch 1214 and wall stops 1208 serve to retain the jack body 1202 in an opening of a patch panel, wall outlet, or other such supporting structure.

Figure 14:
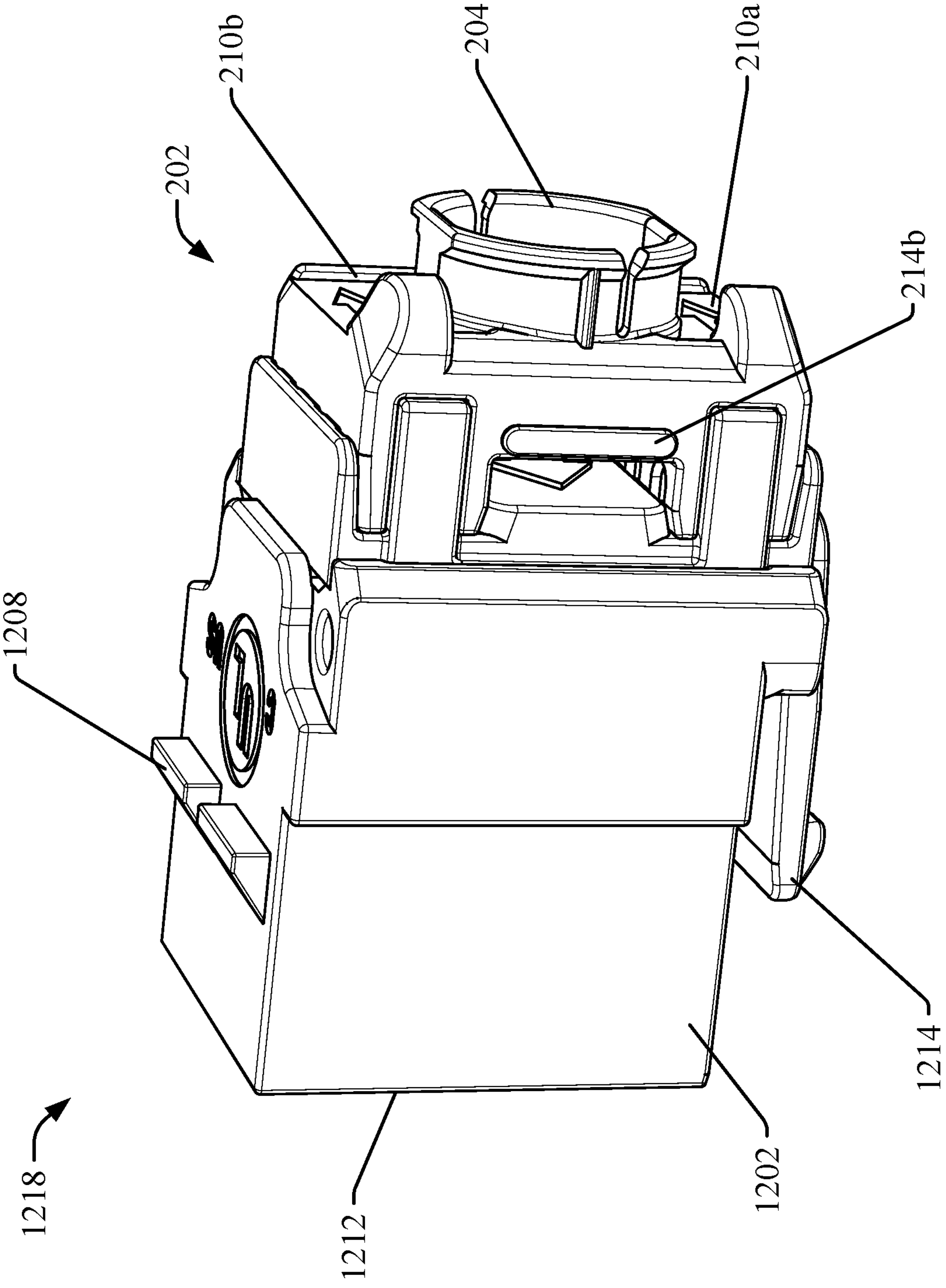
FIG. 14 is a perspective view of the wire management component installed on the rear side of the jack body.

With the conductors 508 of the cable 502 held by the conductor retaining towers 216 of the wire management component 202 as described above (the cable 502 and its conductors are omitted from FIG. 12 for clarity), the wire management component 202 can be aligned with, and installed on, the rear side of the jack body 1202 as shown in FIG. 12. FIG. 14 is a perspective view of the wire management component 202 installed on the rear side of the jack body 1202. When the wire management component 202 and the jack body 1202 are brought together, each IDC tower 1204 of the jack body 1202 is received between a pair of adjacent conductor retaining towers 216 of the wire management component 202 (as illustrated by the dashed lines in FIG. 12). The IDCs 1216 positioned within the jack 1218 are oriented such that, when the IDC towers 1204 of the jack body 1202 are received between the pairs of adjacent conductor retaining towers 216 of the wire management component 202, each IDC 1216 electrically engages with the segment of a conductor 508 that bridges the gap 512 between the two adjacent conductor retaining towers 216 of the wire management component 202 (see gap 512 in FIG. 7) by slicing through (e.g., "piercing") the insulation of the conductor 508 and making contact with the underlying wire. This establishes electrical continuity between each conductor 508 of the cable 502 and the conductive tines within the jack's aperture 1212, thus electrically interfacing the cable 502 with the jack 1218 and, thereby, with a category plug (not shown) inserted into the aperture 1212 of jack 1218 (see, e.g., FIG. 12). If the user wishes to disconnect the wire management component 202 from the jack body 1202, the two raised removal ridges **214*a* and 214*b* serve as grip points for a user's fingers to assist in pulling the wire management component 202 from the jack body 1202 when rear jack doors 902*a*, 902*b*** are in the open position.

FIG. 15 is a perspective rear view of the assembled wire management component 202 and jack body 1202 with two rear jack doors **902*a* and 902*b* attached, yielding a jack assembly. Rear jack door 902*a* has a design corresponding to that illustrated in FIG. 9. As noted above, the dowels 904*a*, 904*b* formed on the hinge arms 906*a*, 906*b* of jack door 902*a* engage with corresponding hinge holes 1210*a*, 1210*b* formed on two rear corners of the jack body 1202 (dowels 904*a*, 904*b* and hinge holes 1210*a*, 1210*b* are not visible in FIG. 15). When attached to the jack body 1202 in this manner, the rear jack door 902*a* can pivot about the hinge holes 1210*a*, 1210*b* between an open position that exposes the wire management component 202 and a closed position that at least partially encloses the wire management component 202. While in the closed position, the curved surface 910 of the rear jack door 902*a* partially surrounds the collar 204 of the wire management component 202**.

The second rear jack door **902*b* is similarly attached to hinge holes 1210 formed on the corners of the jack body 1202 opposite the corners on which the first rear jack door 902*a* is attached. The rear jack door 902*b* has a substantially similar design to that of rear jack door 902*a* but has a shape that allows portions of the second door 902*b* to overlap with corresponding portions of the first door 902*a* while both rear doors 902*a* and 902*b* are in the closed position. While both rear jack doors 902*a* and 902*b* are in the closed position, the doors 902*a* and 902*b* enclose the wire management component 202 while leaving the cable reception hole 208 exposed, with the curved surface 910 of the first jack door 902*a* surrounding a portion of the collar 204 and the curved surface 910 of the second jack door 902*b* surrounding the remaining portion of the collar 204. The two bumps 212*a* and 212*b* of the collar 204 reside within the notches 908 of the curved surfaces 910 of the two jack doors 902*a* and 902*b*, respectively. As described above in connection with FIG. 11, the drain wire 510 passes over a selected one of the two bumps 212*a* or 212*b* and is compressed between the bump 212*a*, 212*b* and the corresponding notch 908**.

FIG. 16 is a perspective front view of the assembled wire management component 202 and jack body 1202 with the two rear jack doors **902*a* and 902*b* attached. The aperture 1212 on the front of the jack 1218** can be seen in this view.

Figure 17:
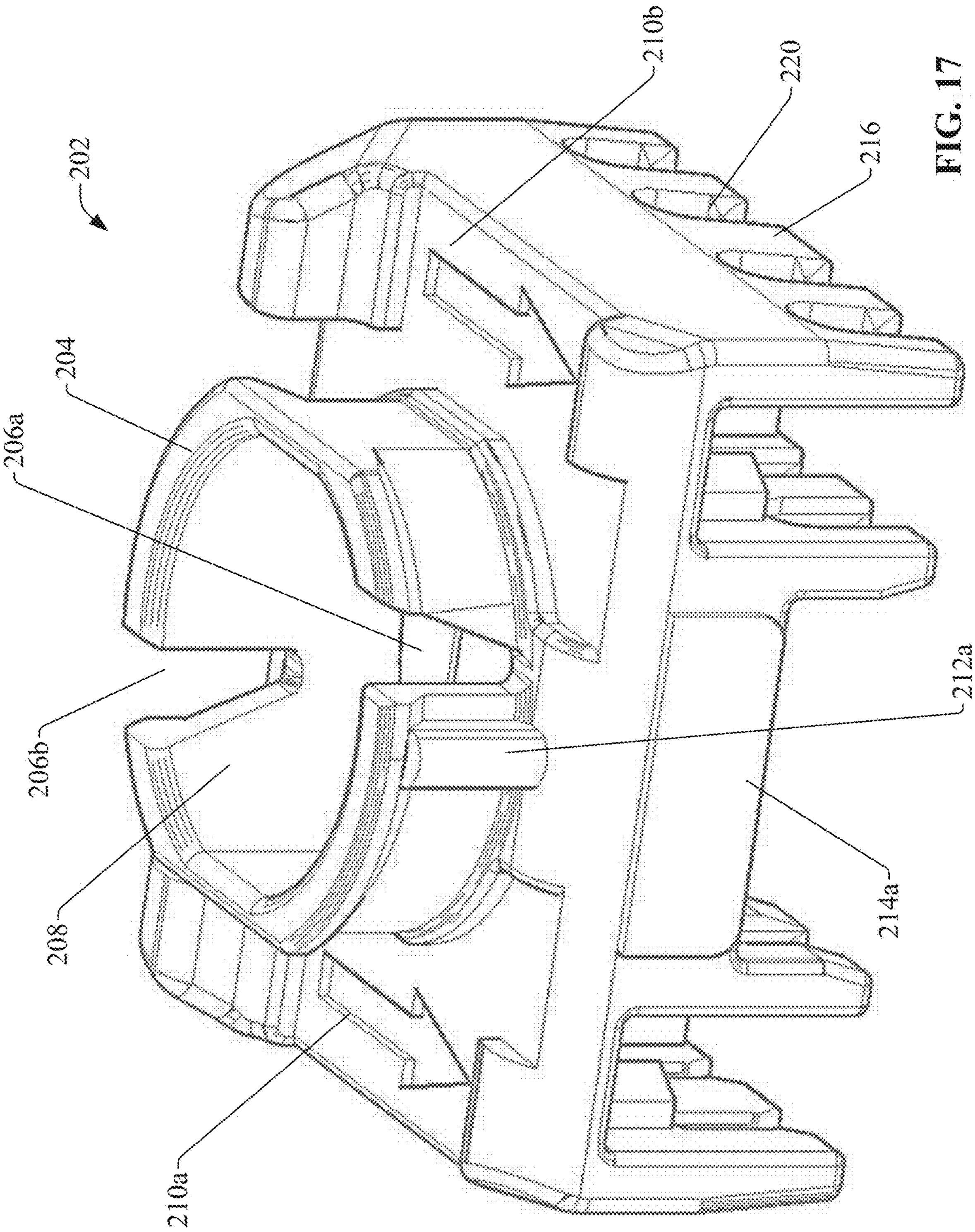
FIG. 17 is a perspective view of an example wire management component having a raised bump that is wider than that of the wire management component of FIG. 2.

The elongated bumps 212 formed on the collar 204 of the wire management component 202 can have substantially any shape or width. FIG. 17 is a perspective view of an example wire management component 202 having a substantially similar design to that depicted in FIG. 2, but whose elongated bumps **212*a*, 212*b* are wider than those of the example depicted in FIG. 2. Increasing the width of the bumps 212*a*, 212*b* can allow the wire management component 202** to accommodate a wider range of drain wire diameters.

The structural features of the jack assembly described herein provide a number of benefits in terms of data signal integrity, conductor management, and ease of assembly. The elongated bumps 212 formed on the collar 204 of the wire management component 202, together with the corresponding notch in the jack door 902, ensure a secure and robust grounding of the cable's drain wire 510 via the metallic jack door 902. The cable stop post 302 controls the installation depth of the jacketed portion of the cable 502 into the conductor organization area of the wire management component 202 as well as the location of the transition point between the cable jacket and the exposed cable conductors 508 relative to the retaining notches 220, which can result in neater conductor routing and easier termination of the conductors. The removal ridges 214 formed on the sides of the wire management component 202 can assist in applying a pull force when removing the wire management component 202 from the jack body 1202.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

What has been described above includes examples of systems and methods illustrative of the disclosed subject matter. It is, of course, not possible to describe every combination of components or methodologies here. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A cable jack assembly, comprising:

a wire management component configured to retain a data cable and to electrically interface conductors of the data cable with conductive contacts of a jack, the wire management component comprising:

a base section through which a cable reception hole is formed; and a collar that traverses a perimeter of the cable reception hole on a side of the base section that receives the data cable, wherein the collar comprises a first slot that extends from a bottom of the collar to a top edge of the collar, and a second slot located opposite the first slot, a first elongated bump is formed on an outer surface of the collar and extends perpendicularly from the base section, and a second elongated bump is formed on the outer surface of the collar opposite the first elongated bump.

2. The cable jack assembly of claim 1, wherein the base section comprises a drain wire recess located adjacent to the collar, and the first slot, the first elongated bump, and the drain wire recess are arranged such that a drain wire of the data cable that exits the collar via the first slot and is routed around the collar to the drain wire recess passes over the first elongated bump.

3. The cable jack assembly of claim 1, wherein the side of the base section that receives the data cable is a first side, the cable jack assembly further comprises a cable stop post formed on a second side of the base section opposite the first side, and the cable stop post is located a distance from an exit of the cable reception hole and is configured to impede insertion of a jacketed portion of the data cable through the cable reception hole beyond the distance from the exit of the cable reception hole.

4. The cable jack assembly of claim 1, wherein the side of the base section that receives the data cable is a first side, the cable jack assembly further comprises retaining towers formed on a second side of the base section that is opposite the first side, and the retaining towers comprise retaining notches configured to retain the conductors of the data cable.

5. The cable jack assembly of claim 4, wherein the wire management component is configured to connect to a jack body of the jack, and connection of the wire management component to the jack body while the conductors of the data cable are held by the retaining notches causes the conductors to electrically interface with the conductive contacts of the jack.

6. The cable jack assembly of claim 5, wherein the wire management component further comprises a first raised removal ridge formed on a first side of the base section adjacent to the side of the base section that receives the data cable, and a second raised removal ridge formed on a second side of the base section adjacent to the side of the base section that receives the data cable and opposite the first side.

7. The cable jack assembly of claim 5, further comprising a jack door comprising hinge arms configured to connect to the jack body, wherein the jack door is configured to pivot about the hinge arms between an open position and a closed position, the jack door comprises a curved surface that surrounds at least a portion the collar while the jack door is in the closed position, a notch is formed in the curved surface, and the notch is configured to receive the elongated bump while the jack door is in the closed position.

8. The cable jack assembly of claim 7, wherein the jack door comprises a conductive material, and while the drain wire is routed around the collar and passes over the first elongated bump, the jack door establishes an electrical connection to the drain wire while in the closed position.

9. The cable jack assembly of claim 5, wherein the wire management component is configured to connect to a rear side of the jack body, and an aperture of the jack is formed on a front side of the jack body.

10. The cable jack of claim 1, wherein the first slot tapers from the top edge of the collar to the bottom of the collar.

11. A system, comprising:

a wire management component comprising a base section, a cable reception hole formed through the base section, a collar formed around a perimeter of the cable reception hole on a first side of the base section, and conductor retaining structures on a second side of the base section opposite the first side, wherein a first slot is formed on the collar and opens at a top edge of the collar, a second slot is formed on the collar opposite the first slot, a drain wire recess is formed adjacent to the collar on the first side of the base section, a first raised bump is formed on an outward-facing surface of the collar and is located between the slot and the drain wire recess, and a second raised bump is formed on the outward-facing surface of the collar opposite the first raised bump.

12. The system of claim 11, wherein a cable stop post is formed on the second side of the base section and is configured to impede a jacket of a data cable when a leading edge of the jacket abuts against the cable stop post while the data cable is being inserted through the cable reception hole via the first side of the base section.

13. The system of claim 11, further comprising a jack body of a jack, wherein the jack comprises an aperture that opens toward a front side of the jack body, the wire management component is configured to connect to a rear side of the jack body, and connection of the wire management component to the jack body causes cable conductors that are held by the conductor retaining structures of the wire management component to electrically connect to conductive tines of the data.

14. The system of claim 13, further comprising a jack door configured to attach hingedly to the jack body and, while attached to the jack body, pivot between an open position and a closed position, wherein the jack door comprises a curved surface that surrounds at least a portion of the collar while the jack door is in the close position, a notch is formed in the curved surface, and while the jack door is in the closed position, the first raised bump resides within the notch.

15. The system of claim 14, wherein the jack door comprises a conductive material.

16. The system of claim 11, wherein the wire management component further comprises a first raised removal ridge and a second raised removal ridge formed on respective opposite sides of the base section that are adjacent to the first side.

17. A cable jack assembly, comprising:

a wire management component comprising a base section through which a cable reception hole is formed, wherein a collar is formed around the cable reception hole on a side of the base section, the collar comprises a slot that extends from a bottom of the collar to a top edge of the collar, and an elongated bump is formed on an outer surface of the collar and extends perpendicularly from the base section; and a jack door configured to at least partially enclose the wire management component while in a closed position, wherein the jack door comprises a curved surface that at least partially surrounds the collar while the jack door is in the closed position, and the curved surface comprises a notch configured to receive the elongated bump while the jack door is in the closed position.

18. The cable jack assembly of claim 17, wherein the side of the base section on which the collar is formed is a first side, the wire management component further comprises a cable stop post formed on a second side of the base section opposite the first side, and the cable stop post is configured to impede a jacket of a data cable when a leading edge of the jacket abuts against the cable stop post while the data cable is being inserted through the cable reception hole via the first side of the base section.

19. The cable jack assembly of claim 17, wherein the side of the base section is a first side, the cable jack assembly further comprises retaining towers formed on a second side of the base section that is opposite the first side, and the retaining towers comprise retaining notches configured to retain the conductors of a data cable.

20. The cable jack assembly of claim 19, wherein the wire management component is configured to connect to a jack body of a jack, and connection of the wire management component to the jack body while the conductors of the data cable are held by the retaining notches causes the conductors to electrically interface with conductive contacts of the jack.

* * * * *